US010656806B2

(12) United States Patent
Jhawar et al.

(10) Patent No.: US 10,656,806 B2
(45) Date of Patent: May 19, 2020

(54) DISPLAY INTERFACE SYSTEMS AND METHODS

(71) Applicant: Augmentalis Inc., Carlsbad, CA (US)

(72) Inventors: Manoj Jhawar, Carlsbad, CA (US); Andy Simmons, Carlsbad, CA (US)

(73) Assignee: AUGMENTALIS INC., Carlsbad, CA (US)

( * ) Notice: Subject to any disclaimer, the term of this patent is extended or adjusted under 35 U.S.C. 154(b) by 0 days.

(21) Appl. No.: 16/389,707

(22) Filed: Apr. 19, 2019

(65) Prior Publication Data

US 2019/0324613 A1 Oct. 24, 2019

Related U.S. Application Data

(60) Provisional application No. 62/660,990, filed on Apr. 21, 2018.

(51) Int. Cl.
| | |
|---|---|
| *G06F 3/0484* | (2013.01) |
| *G06F 3/16* | (2006.01) |
| *G06F 3/0481* | (2013.01) |
| *G06F 3/01* | (2006.01) |

(52) U.S. Cl.
CPC .......... *G06F 3/0484* (2013.01); *G06F 3/012* (2013.01); *G06F 3/016* (2013.01); *G06F 3/017* (2013.01); *G06F 3/04812* (2013.01); *G06F 3/167* (2013.01)

(58) Field of Classification Search
CPC ........ G06F 3/0484; G06F 3/017; G06F 3/012; G06F 3/167; G06F 3/016
See application file for complete search history.

(56) References Cited

U.S. PATENT DOCUMENTS

| | | | | |
|---|---|---|---|---|
| 6,424,357 | B1 * | 7/2002 | Frulla | G06F 3/038 |
| | | | | 715/716 |
| 6,615,237 | B1 * | 9/2003 | Kyne | G06F 16/9566 |
| | | | | 709/203 |
| 8,503,932 | B2 * | 8/2013 | Demuynck | G06F 1/1626 |
| | | | | 345/156 |
| 9,911,418 | B2 * | 3/2018 | Chi | G06F 16/951 |
| 2013/0033643 | A1 * | 2/2013 | Kim | G06F 3/017 |
| | | | | 348/563 |
| 2016/0170779 | A1 * | 6/2016 | Zielinski | G06F 13/10 |
| | | | | 703/26 |

\* cited by examiner

*Primary Examiner* — Matthew Ell
(74) *Attorney, Agent, or Firm* — Sheppard, Mullin, Richter & Hampton LLP

(57) ABSTRACT

Systems and methods are provided for implementing an interactive application, which incorporates voice-driven and motion-driven interactions with media content in a display device. An application instance can be initialized for interacting with media content output to a display device, such as an head mounted display (HMD). Then, a determination whether a received user interaction is interpretable into an interactive command defined by an operating system (OS) is performed. If the OS can interpret the user interaction, the interactive command can be executed with actions generated by the OS. Alternatively, an emulation of the interactive command may be executed, when the user interaction cannot be interpreted by the OS. Subsequently, the media content is presented within a user interface based on the interactive command. For example, user interaction can be the head movement of a user that is interpreted into a command that controls presentation of web content in the HMD.

16 Claims, 22 Drawing Sheets

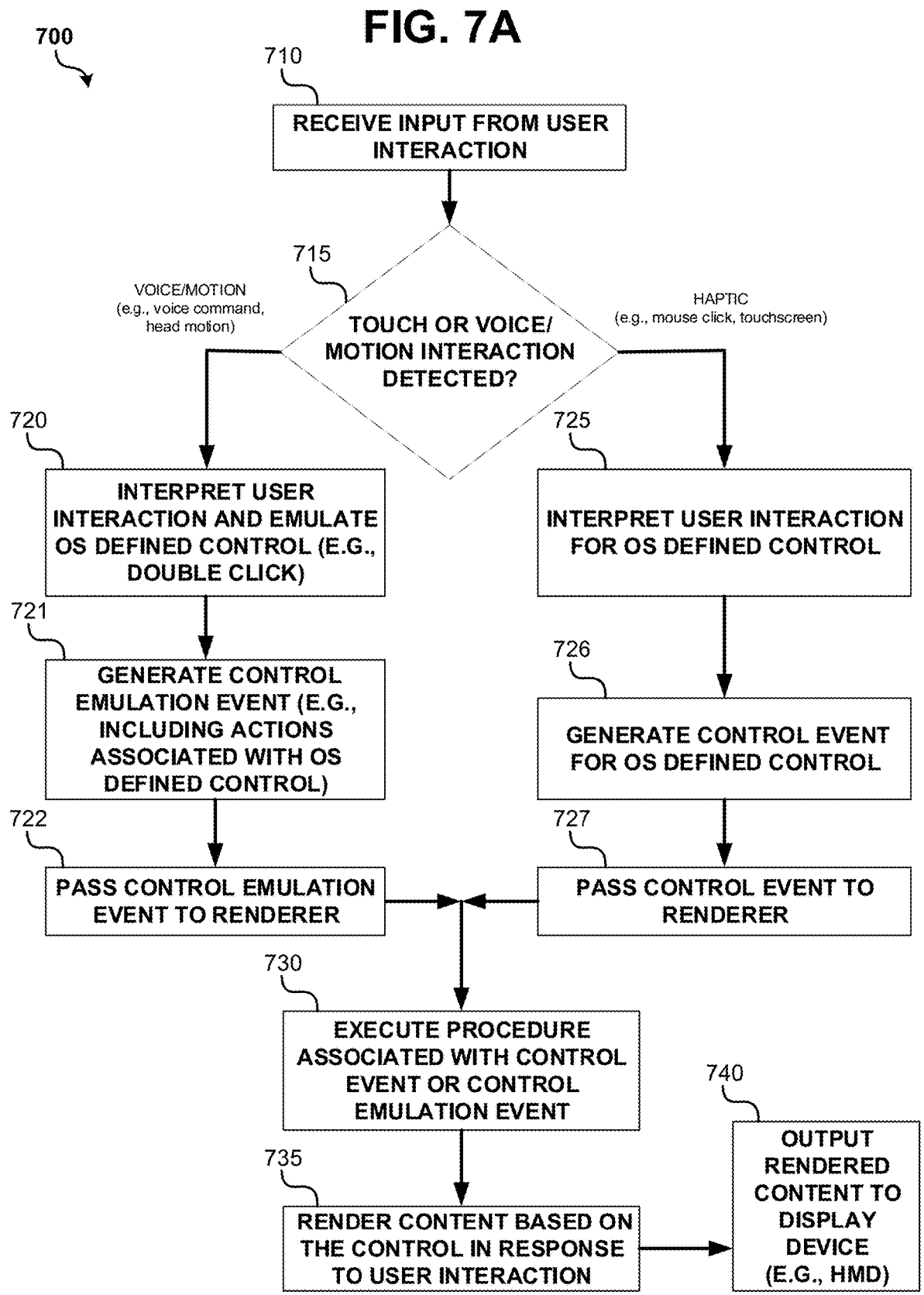

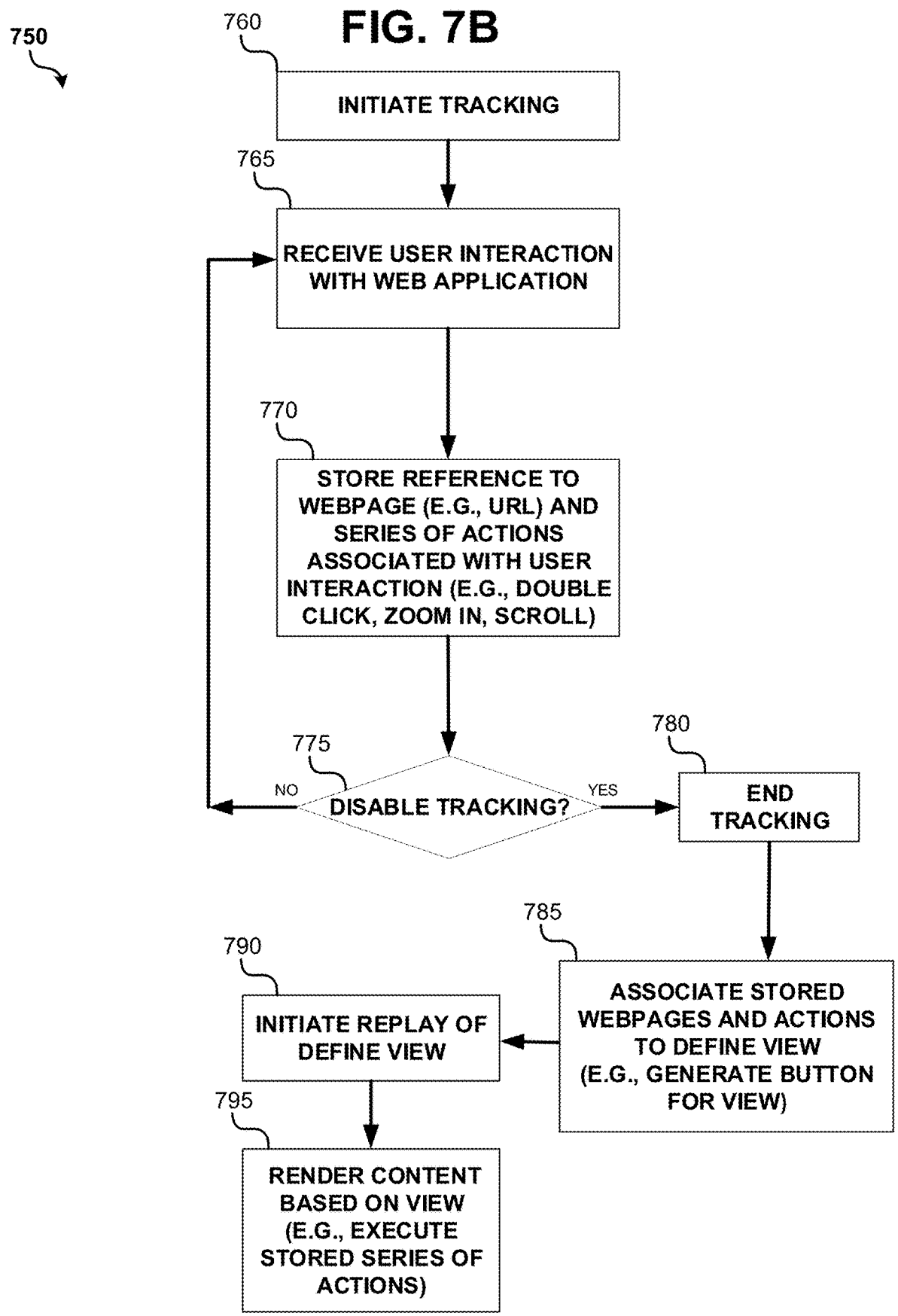

DISPLAY INTERFACE SYSTEMS AND METHODS

CROSS-REFERENCE TO RELATED APPLICATIONS

The present application claims the priority benefit under 35 U.S.C. 119(e) of U.S. Provisional Patent Application No. 62/660,990, filed Apr. 21, 2018, which is incorporated herein by reference in its entirety.

BACKGROUND

Mobile display devices such as handheld devices (e.g., tablet computers, smartphones) and wearable electronic devices (e.g., head mounted displays (HMDs)) are ubiquitous in computing. In many instances, mobile display devices utilize software applications that implement user interfaces (UI) and user experience (UX) environments to allow a user to access, view, and interact with content from distributed computer networks, such as the Internet, and locally available information from local networks or individual computers and devices (e.g., computer, phone, etc.).

As these display devices typically have a smaller form factor than desktop devices, they may be preferable for users to access web-based content from remote locations (e.g., outside of the office or home). For example, employing a tablet computer to view a website may be more desirable for a field worker at a construction site than use of a standard desktop computer. However, despite techniques like "Responsive Web Design" and the implementation of specific sites designed for mobile devices, many web-based applications or websites implement web-based UI-UX environments that are not optimized for display and interaction on mobile display devices (e.g., due to their small display area, native user input controls, etc.).

Moreover, some mobile display devices do not include mechanisms that allow a user to interact with the device, and the content displayed thereon, via conventional web-based touch or tactile means. HMDs, for example, allow for the visual experience of existing or computer-generated environments and interaction with media content display therein via body movement, hand movements, head movement, eye tracking, and/or voice commands. However, HMDs may not be designed to receive direct touch input from the user using mice, keyboards, and the like. Accordingly, there may be a measure of difficulty and restriction for various conventional web-based touch interactions (e.g., mouse click, mouse movement) on some mobile display devices that may be otherwise typical on desktop computers.

Software applications are often designed to implement a range of different functions that are rendered using a particular set of web-based controls. As an example, software used in an industrial field can support various tasks related to the industry, including: workflow; inventory management; customer relations management systems; data visualization; and business intelligence solutions. To support this multi-functionality, software applications can consist of a bundle of different programs (e.g., application suite). In the event that an enterprise desires to use these applications with portable display devices (e.g., HMDs, smartphones, etc.), the software application may need to be rewritten for the particular display device, and/or undue amounts of software development work may be needed to achieve full integration. In addition to the resources and effort required, the results may not be optimal for user interaction.

Additionally, the UIs supported by such redesigned applications can present vast amounts of information, using a plurality of interfaces, in a manner that is cumbersome to users, and potentially decreasing the efficiency of the software in practical use. For instance, it may be difficult for users such as field workers that are not used to these new UIs, to adopt and utilize a new or redesigned software application that may present an unnecessarily large set of options and information.

BRIEF SUMMARY OF THE DISCLOSURE

In accordance with one embodiment, a method includes providing an application that is capable of incorporating voice-driven and motion-driven user interactions with the content in a display, such as an HMD. The method may include initializing an application instance for interacting with media content that is output to a display, then receiving input associated with a user interaction. The input can indicate an interactive command for interacting with the media content. Further, the method can determine whether the user interaction is interpretable into an interactive command defined by an operating system of the display device. In the case that the user interaction is interpretable by the operating system, execution of the interactive command can be initiated in accordance with actions generated by the operating system. Alternatively, if the user interaction is not interpretable by the operating system of the display device, executing an emulation of the interactive command may be initiated. Thereafter, the media content can be rendered for presentation within a user interface for the application, based on the interactive command. The user interaction may be at least one of: a voice interaction with an audio device coupled to the display device; a haptic interaction with an input device coupled to the display device; or a motion interaction with a motion sensing device coupled to the display device.

In accordance with another embodiment, a method includes providing multiple viewports that can be presented in a mobile display device, for example an HMD. The method can include initializing an application instance for interacting with web content that is output to a display device. Then, a viewport of the web content can be rendered to the HMD for presentation within a user interface. The method may also render guidelines over the web content, where user input can set a cursor position relative to the guidelines. Accordingly, based on the cursor position relative to the guidelines, a panning speed through the viewport can be can be set that is responsive to a head motion by a user of the HMD.

In accordance with yet another embodiment, a non-transitory computer-readable medium includes instructions for providing an application that is capable of incorporating voice-driven and motion-driven user interactions with the content in a display, such as an HMD. The computer-readable medium may further include instructions for initializing and/or running an application instance for interacting with media content that is output to a display, then receiving input associated with a user interaction. The input can indicate an interactive command for interacting with the media content. Further, a determination whether the user interaction is interpretable into an interactive command defined by an operating system of the display device can be made. In the case that the user interaction is interpretable by the operating system, execution of the interactive command can be initiated in accordance with actions generated by the operating system. Alternatively, if the user interaction is not interpretable by the operating system of the display device, executing an emulation of the interactive command may be initiated. Thereafter, the media content can be rendered for presentation within a user interface for the application, based on the interactive command. The user interaction may be at least one of: a voice interaction with an audio device coupled to the display device; a haptic interaction with an input device coupled to the display device; or a motion interaction with a motion sensing device coupled to the display device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 7A an operational flow diagram illustrating an example process that may be implemented to incorporate voice-driven, motion-driven, and touch-driven interactions with web content in a mobile display device by the application of FIG. 6.

FIG. 7B is an operational flow diagram illustrating an example process that may be implemented to provide action replay optimization by the application of FIG. 6.

The figures are not exhaustive and do not limit the disclosure to the precise form disclosed.

DETAILED DESCRIPTION

In view of the above described issues associated with converting legacy software applications for use with mobile display devices, it may be desirable to leverage legacy software applications and systems, and further integrate aspects that extend use of the legacy mechanisms to mobile display devices without requiring any modification to the original software applications (e.g., no modification to the underlying scripts used to execute controls on such applications). Implementations described herein are directed to leveraging existing web-based software applications and/or websites that may not have originally been designed to display properly on certain mobile display devices (e.g., HMDs, smartphones, tablets, etc.), and supporting their display and use on the mobile display devices without modifying or making minimal modifications to the original applications.

Figure 1A:
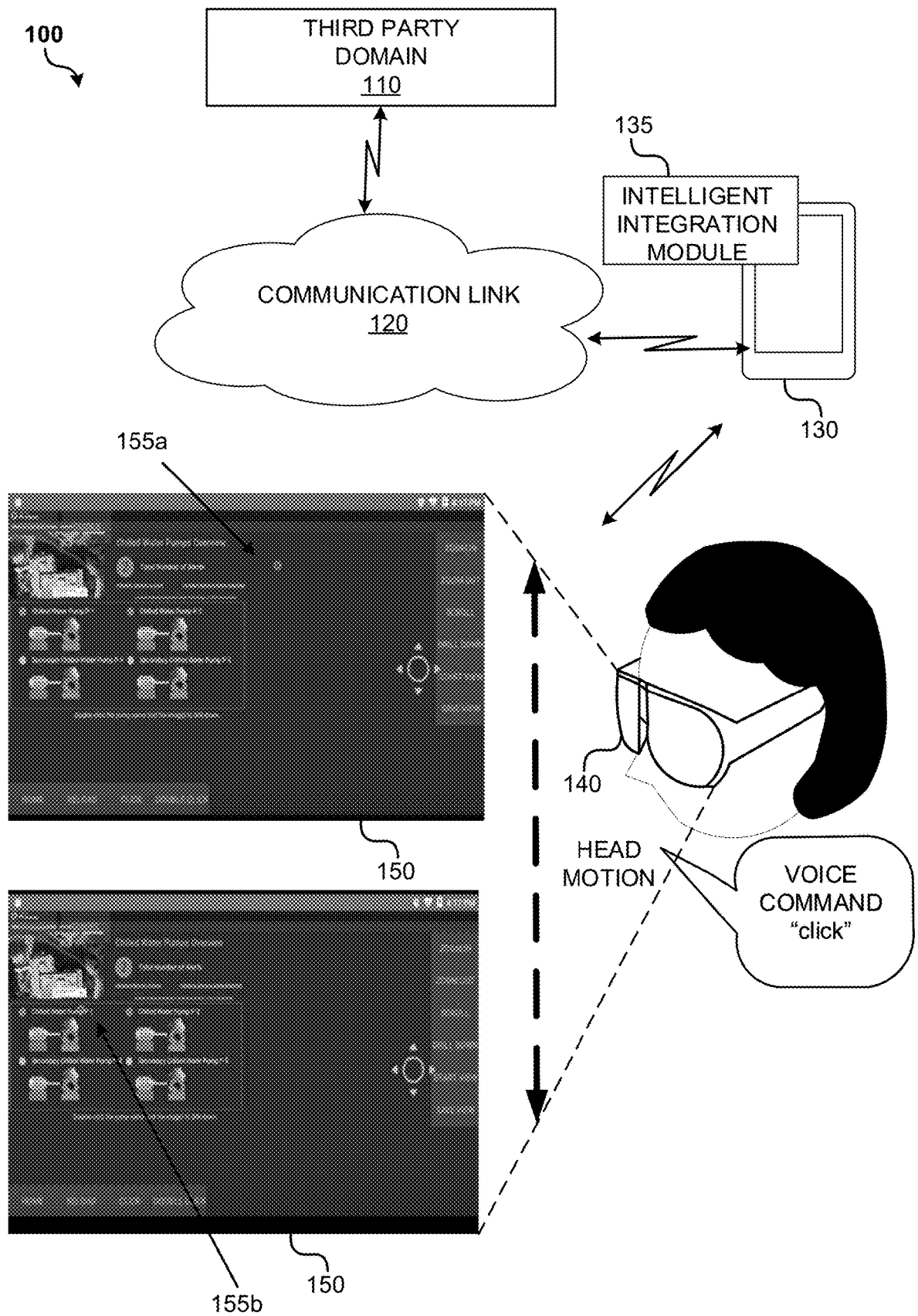
FIG. 1A illustrates an exemplary communication environment in which embodiments disclosed herein may be implemented for providing an interactive web application, and incorporating voice-driven and motion-driven interactions with web content in a mobile display device such as a HMD.

FIG. 1A illustrates an example communication environment 100 in which embodiments disclosed herein may be implemented for providing an interactive web application, and incorporating voice-driven and motion-driven interactions with web content in a mobile display device (in this example, a HMD 140). The web application may provide content 150 that includes media information that is rendered on HMD 140. While existing HMDs provide a host of visualization and display interactions, they are unable to or limited in their ability to receive input from a user using input mechanisms conventionally used on desktop computers (e.g., mouse or keyboard) or touch-based mechanisms used on handheld display devices.

To this end, an intelligent integration module 135 may be implemented to leverage existing capabilities of legacy software applications (e.g., legacy web-based software applications that may be optimized for display on standard desktop computers), while integrating new aspects that customize the software to adapt to use on mobile devices, such as smartphones, tablets, and wearables such as HMDs. For example, FIG. 1A shows a user employing a HMD 140 to view visual content 150 that is rendered and displayed while running an interactive web application. By utilizing the intelligent integration module 135, even though the user may not be able to employ conventional touch-driven input via the HMD 140 to interact with the web application, the user may still interact with the web in an interactive UI-UX environment. Although embodiments relating to mobile computing devices and software (e.g., mobile OS, ANDROID and IOS) are described, it should be appreciated that the intelligent integration module 135 and relating capabilities can be implemented on devices that are not mobile/portable, such as desktop computers and operating systems (e.g., WINDOWS, MACOS and LINUX). As an example, the intelligent integration module 135 can be configured to convert desktop applications to incorporate voice-driven functionality as described herein.

The intelligent integration module 135 may be configured to extend functionality of available software applications for use with mobile display devices, such as the HMD 140. According to implementations, the intelligent integration module 135 may provide voice-driven and motion-driven UI controls, enabling navigation and interaction with content 150 (e.g., performing actions such as clicking on links, moving a cursor) via "hands-free" interactions with HMD 140. For example, FIG. 1 illustrates a cursor moving from a first position 155a to a second position 155b, in response to motion detected from the user's head. Additionally, FIG. 1 illustrates the user using a voice command that can be used to interact with an interactive web application and the content 150. As an example, the user can say "click" to emulate a mouse click of a web app.

In this example environment, the integration module 135, and its associated data processing tasks (e.g., speech recognition, natural language processing of voice commands, etc.) may be offloaded to device 130. In other implementations, HMD 140 may implement some or all data processing tasks).

A communication link 120 may provide a wireless communication link between HMD 140 and device 130 using any number of wireless communication protocols such as: WIFI, BLUETOOTH, ZIGBEE, cellular based protocols, etc. In some implementations, communication link 120 may comprise a wired link between HMD 140 and device 130. Device, 130, in implementations, may comprise a smartphone, a tablet, a laptop, a workstation, a local or remote server, or a wearable device such as a smartwatch.

Communication link 120 may also provide communication between HMD 140 or device 130 and third-party domains 110 that may store media content, and/or support cloud-based services associated with the intelligent integration module 135. The third-party domain 110 may include a data center and support a variety of services related to capabilities of the utilized software applications, including: security services, natural language processing (NLP), industrial application services, and communication/collaboration services.

In example environment 100, HMD 140 may comprise an augmented reality (AR) display such as a monocular video see-through display, a bi-ocular video see-through display, a monocular optical see-through display, or a bi-ocular optical see-through display. Alternatively, HMD may comprise a VR display such as a video display that is not see-through. The HMD may be implemented in a variety of form factors such as, for example, a headset, goggles, a visor, or glasses.

As noted above, in the communication environment of FIG. 1A, the content 150 presented on HMD 140 may be dynamically manipulated, modified, or otherwise interacted with using vocal commands, head motion, touch interactions, and the like. More particularly, as a user interacts with content 150 in real time, the user may issue voice commands that may affect individual or multiple viewports in a display. Additionally, interactions may result in the creation of new views.

Figure 1B:
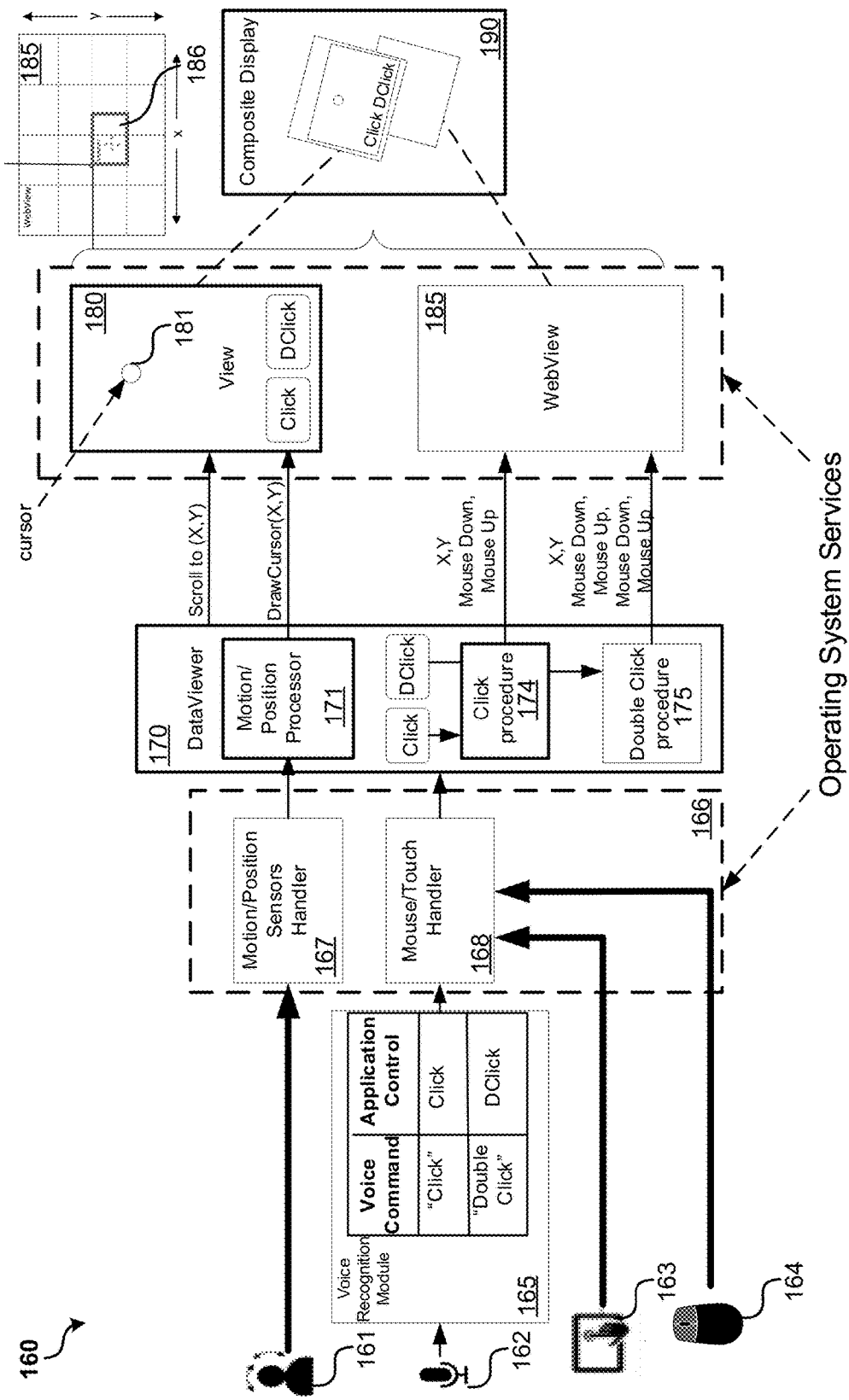
FIG. 1B is a diagram illustrating examples of the communication flow between various components of an intelligent integration module for providing an interactive web application, and incorporating voice-driven, motion-driven, and touch-driven interactions with web content, in accordance with implementations.

FIG. 1B is a conceptual diagram illustrating examples of the communication flow 160 between various components of an intelligent integration module 135 for providing an interactive web application, and incorporating voice-driven, motion-driven, and touch-driven interactions with web content, in accordance with implementations. Various components that comprise the intelligent integration module 135 (shown in detail in FIG. 2) may function in concert to realize a hands-free environment, illustrated in FIG. 1A. Multiple Operating System (OS) level and UI level elements may cooperatively integrate their functions, thereby allowing a user to interact with web content using different types of user interactions. In some cases, the user interaction driving the flow may be dictated by the mobile device display. In FIG. 1B, example user interactions include head motion 161 and voice 162 as interactive inputs, which may be a preferable (e.g., hands-free) actions when a user is wearing a HMD 140. Also, FIG. 1B shows that the integration module supports touch-driven interactions, illustrated as touching (e.g., hand contact) a touchscreen device 163 and manually controlling a mouse 164, which may be more conventionally used for web navigation in computing environments.

In the case of touch-driven interactions, involving touchscreen 163 and mouse 164, a mouse/touch handler 166 receives data input from the respective devices, in response to the user's haptic contact. In some existing mobile operating systems (e.g., IOS and ANDROID) a service is provided to render webpages by interpreting web-based programming languages such as Hypertext Markup Language (HTML) and JavaScript. In FIG. 1, this service is illustrated as WebView 185. WebView 185 may be implemented by a Java class, and utilized in ANDROID supported devices, for example. In implementations, WebView 185 is configured to interpret HTML and JavaScript directives that define UI controls associated with certain touch-driven interactions, such as interacting with touchscreen 163 and mouse 164. A UI control may be a visual element on a computer screen that can be used as a mechanism to enable users to interact with underlying software. Furthermore, controls can be associated with software procedures defined by the HTML and JavaScript derivatives.

Examples of controls include, but are not limited to: buttons, checkboxes, links, tabs, charts, windows, and the like. As an example, implementing a control may involve generating and responding to user interactions, for instance touching a point on a touchscreen or clicking a mouse button. Continuing with the example, when a rendering engine displays a control, such as a button, it defines a region of the display. A region of the display can be a rectangular region located at a specific row and column on the display (e.g., specific coordinate or pixel locations), and spanning some number of pixels in height and in width. The process of interpreting the HTML and JavaScript may involve the renderer creating a control table that maps the control position coordinates to a specific procedure, defined in the HTML and JavaScript, and causes it to be executed in response to detection of an interaction (e.g., mouse click, or touch) in the region.

In referring to the information flow 160, the OS includes software mouse/touch handlers 168, that are drivers that monitor interactions 163, 164 and transmit an event (i.e., software message or notification) that contains the coordinates of the interaction, and calls the DataViewer 170 application program interface (API) to transmit the information to DataViewer 170. Subsequently, DataViewer 170 may determine whether the interaction is within the region defined by the control, and dispatch the procedure associated with the control.

Additionally, DataViewer 170 may implement procedures that define "custom" controls that can respond to voice commands 162 and head motion 161. DataViewer 170 transmits or injects an event that is similar to an OS event associated with the control, to be rendered using WebView 185. WebView 185 does not distinguish whether the event came from the OS mouse/touch handler 168, or from a DataViewer 170 procedure, and thus may respond to both in the same manner. As an example, DataViewer 170 may implement a procedure called "dclick" that emulates a double click of a mouse (or double tap of a touch screen).

In some implementations, a procedure (e.g., "dclick") can be executed by DataViewer 170 when speech from the user is recognized by an application 165 (in this example, WearHF) as a voice interaction 162 indicating the command (e.g., "double click"). In this example, application 165 is configured to associate web-based UI controls with voice controls (e.g., by extracting metadata from the UI controls). As illustrated, it includes a control table that associates specific voice commands with controls. FIG. 1B shows that table as associating the voice command "click" with the application control click, and a voice command "double click" with application control DClick. The application control is further associated with a procedure, and application 165 sends an event to the mouse/touch handler 168.

The mouse/touch handler 168 handles or manages a haptic interaction, such as a "click" of mouse 164. The mouse/touch handler 168 may represent an OS driver that generates a software event that is a message sent to the DataViewer 170. Then, DataViewer 170 may emulate the control and the interaction, for example clicking. As an example, if the user interacts with touchscreen 163 by pressing a button representing a double click, "Dclick", the click event is passed to the DataViewer 170 and the DataViewer 170 emulates a double click action for the WebView 185.

In some implementations the information communicated between the OS mouse/touch handler 168 and the DataViewer 170 is a UI event that conveys that a specific control was activated. The mouse/touch handler 168 is configured though the application to execute a specific procedure implemented by the DataViewer 170, in response to activation of a specific control.

DataViewer 170 may define an application control and the action, or software procedure, associated with it. For instance, DataViewer 170 creates an event implementing the procedure. The event contains the current cursor X,Y coordinates, and an action description. Using this information, the WebView 185 may interpret the event as an action being performed at the current cursor location. According to the embodiments, the WebView 185 does not distinguish if the event came from a touchscreen 163, mouse 164, or the DataViewer 170 emulator. In the event of a click control, for example, the "Click" procedure 174 is executed. Alternatively, in the case of a "Dclick" control, for example, the double click procedure 175 is executed. Then, DataViewer 170 may call the API of WebView to pass the event data for the specific procedure.

The information passed between DataViewer 170 and WebView 185 may include: the action, for example, load a URL, zoom in, mouse click, etc.; the current WebView 185 cursor coordinates; and optional parameters, for example a scroll to X position and Y position, if the action is a scroll command. For example, DataViewer 170 may pass X, Y, mouse down, mouse up event data for the click procedure 174. As another example, for a double click procedure 175, DataViewer may pass X, Y, mouse down, mouse up, mouse down, mouse up. As a result, WebView 185 may respond based on the defined actions for the control defined in the webpage or web application.

Referring back to head motion 161, the information flow 160 illustrates that motion is detected by the OS motion/position sensor handler 167 to trigger a control. In some instances, a mobile display device includes components with movement/position detection capabilities, such as accelerometers, gyroscopes, and the like. The DataViewer 170 may be configured to implement a procedure to determine the position changes corresponding to the sensed movement. A motion/position processor 171 may track changes in position from the user's detected movement (e.g., up, down, left, right), and then translate those changes into incremental cursor changes (e.g., delta x, delta y). The DataViewer 170 may implement changes to a viewport position, in relation to sensed motion (e.g., when frozen, the viewport can only change in response to a voice command or click corresponding to the "scroll" action, and when unfrozen, the viewport moves across the webpage in response to the user's head motion). As referred to hereinafter, a "viewport" is a region that displays a subsection of the webpage. The DataViewer 170 may create an event that is communicated to manipulate view 180. The information flow 160 illustrates the events as a "draw cursor" action (including the determined X, Y coordinates for cursor 181) and a "scroll to" action (including the determined X,Y coordinates for cursor 181), based on the detection movement. Consequently, the cursor 181 is repositioned within view 180 to a point that is relative to the head motion of the user.

FIG. 1B further illustrates that multiple outputs, for instance the viewports generated for View 180 and WebView 185. As shown, WebView 185 can present a Viewport 186 to a user. Referring back to the "scroll to" action, head movement of the user can then drive the WebView 185 to scroll the Viewport 186 to a position, illustrated as an upper right-hand corner, by moving the Viewport 186 across the webpage to the designated X,Y coordinates of the WebView 185. In some instances, the View 180 and the WebView 185 can be displayed to the user simultaneously as a composite display 190. This example implementation, involving composite display 190 and related features, are discussed in greater detail with reference to FIG. 3.

Figure 2:
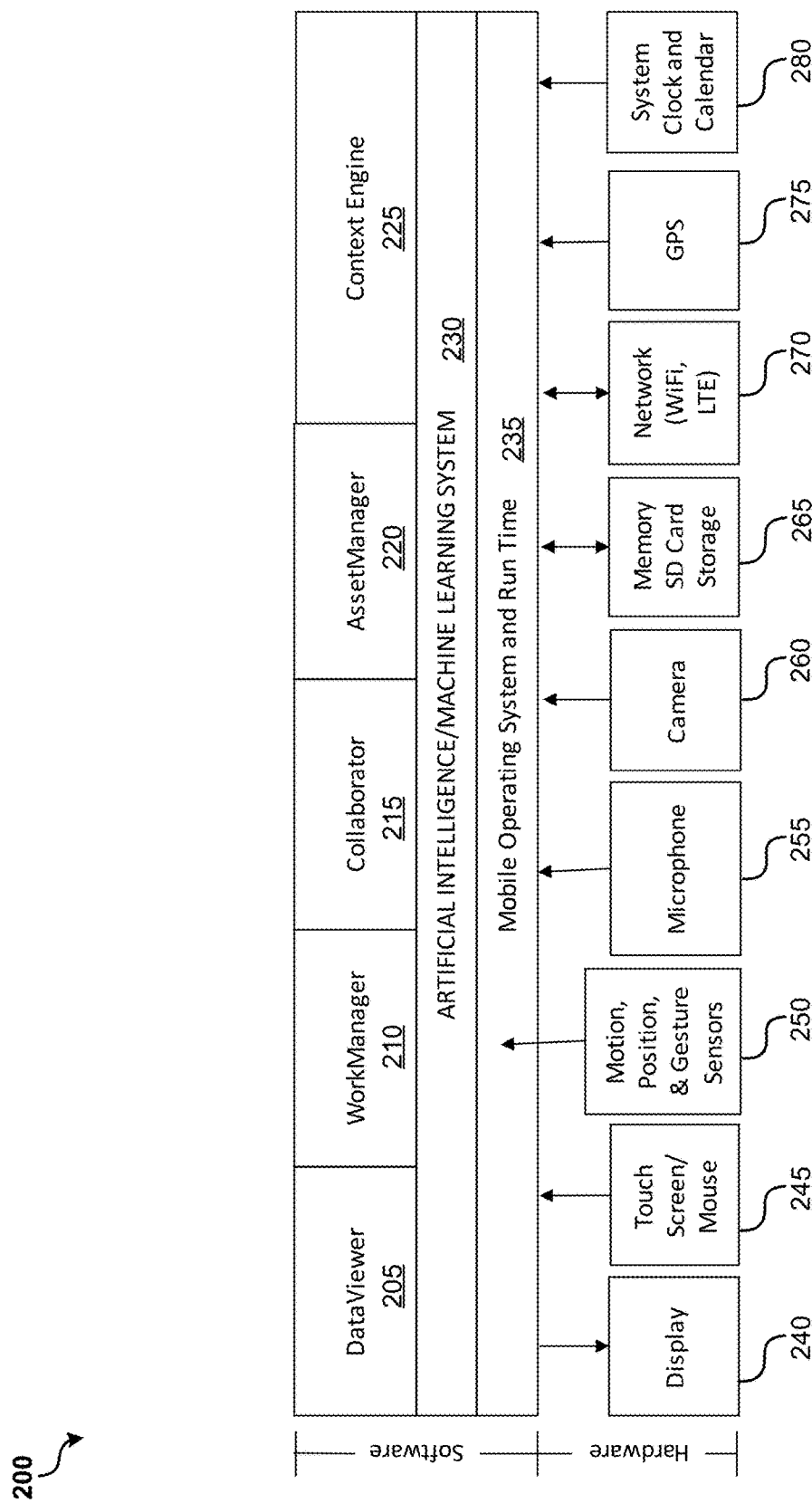
FIG. 2 illustrates an example architecture of a system implementing an intelligent integration module, including the hardware-level and software-level components for providing the various capabilities that may be implemented in embodiments.

As noted above, in the communication environment of FIG. 1A, the system includes an intelligent integration module 135 implemented to integrate applications that provide various extended capabilities, such as hands-free web interactions, with existing legacy applications. FIG. 2 shows an example architecture of a system 200 implementing functions of intelligent integration module 135. In FIG. 2, the architecture is shown to include several hardware-level and software-level components. For example, system 200 may comprise one or more of a handheld display device, a HMD, or other mobile computing device.

As shown, system 200 may comprise multiple hardware components including: a display 240; touchscreen/mouse 245; motion, position, and gesture sensors 250; microphone 255; camera 260; memory 265; network interface 270; global positioning system (GPS) sensors 275; and system clock 280.

In an embodiment, the system 200 can be implemented in a device, such as a mobile phone that communicatively couples to HMD 140 of FIG. 1A. Accordingly, data processing tasks relating to implementing and interacting with aspects of the intelligent integration module 135, including incorporating motion-driven and voice-driven interactions with web content, may be off-loaded to system 200. It should be appreciated that in an alternative implementation, system 200 includes the HMD 140, where the HMD is configured to implement some, or all of the data processing tasks related to the intelligent integration module 135.

In HMD implementations, the display 240 of system 200 may comprise video see-through displays, optical see-through displays, or video or optical displays that are not see-through (e.g., VR displays). Camera 260, in various embodiments, may be configured to capture the user's FOV in real-time. The camera 260 may be positioned, for example, on the side of the user's head. Depending on the implementation of system 200, the camera 260 may be implemented as a video camera, light-field camera, low-light camera, or some combination thereof.

During operation, microphone 255 may receive vocal input (e.g., vocal commands for interacting with controls of a web-based application) from a user of HMD 140 that is digitized and transmitted to another device implementing voice-command navigation. In various embodiments, microphone 255 may be any transducer that converts sound into an electric signal that is later converted to digital form. For example, microphone 255 may be a digital microphone including an amplifier and analog to digital converter. Alternatively, a processing module may digitize the electrical signals generated by microphone 255. In some implementations, microphone 255 may be implemented in system 200 or a headset (e.g., earphones, headphones, etc.) connected to HMD 140 or system 200.

Motion, position, and gesture sensors 250, hereinafter referred to collectively as motion sensors, may generate electronic input signals representative of the orientation of HMD 140 and/or hand gestures may by a user. These electronic input signals may be received and processed by circuitry of processing module to determine a relative orientation of HMD 140. In various embodiments, motion sensors 250 may comprise one or more gyroscopes, accelerometers, and magnetometers.

Memory 260 may comprise volatile memory (e.g. RAM), non-volatile memory (e.g. flash storage), or some combination thereof. In embodiments, memory 260 may store information obtained using camera 260, microphone 255, motion sensors 250, or some combination thereof. In an implementation, memory 265 includes a small flash memory card designed to provide high-capacity memory in a small size, such as a secure digital (SD) card.

Network interface 270 may connect system 200 to the internet using, for example, a WIFI network, a cellular network, for example the Long-Term Evolution (LTE) standard for high-speed wireless communication for mobile devices, a satellite network, or some combination thereof. Network interface 270 may also connect the HMD 140 to system 200 through communication link 300, as illustrated in FIG. 1 using, for example, a BLUETOOTH connection, a ZIGBEE connection, a WIFI connection, or the like.

FIG. 2 illustrates software-level components of system 200, including: DataViewer 205; workmanager 210; collaborator 215; assetmanager 220; context engine 225; artificial intelligence/machine learning 230, which may be an AI service provided by the OS developer (e.g., APPLE CORE ML, or ANDROID TENSORFLOW); and mobile operating system and run time 235. In embodiments, DataViewer 205 may be implemented as DataViewer 170 described above. In some cases, elements of the DataViewer 205 are utilized throughout the other components of the intelligent integration module discussed herein.

The workmanager 210 may incorporate legacy workflow systems or provide default workflow services to implement tasks and procedures. Workmanager 210 may support additional functions such as compliance with e-discovery, including written, video, and visual recording.

Collaborator 215 may be configured to provide communications via video, voice, or text between one or more parties. In the event that there is one collaborator 215, the session can be archived for later review. In some cases, whole sessions, or snapshots, are archived for compliance and training.

Assetmanager 220 is also illustrated in FIG. 2. The assetmanager 220 may provide a front end for enterprise Content Management Systems (CMS) or Digital Asset Management (DAM) solutions to provide digital assets (CAD drawings, movies, photos, images, sound recordings, documents, etc.).

Context engine 225 may be configured to manage information regarding: locations from inputs such as Global Positioning System (GPS) and position sensors; time of day and calendar information; historical applications execution; image recognition; equipment tags (e.g., Quick Response (QR) codes, bar codes, etc.). In some implementations, the context engine 225 may be employed to recommend information to be displayed with additional information relating to the user, for example along with the user's role and tasks. As an example, as the worker carries out a task, real-time information is evaluated by the context engine 225 to recommend additional information from available applications. Functions of the context engine 225 can be based on several triggers, including but not limited to: real-time events and data analysis (including measurements relative to a set threshold, a certain period of time that has elapsed, and the like); executing a step in a workflow process (relevant real-time data measurements, digital assets, identity of an expert with specific knowledge of the process); and identification of an object (through image classification, reading a tag, geolocation, or a combination to suggest information relevant to the object like inspections or repair procedures that might be due, documentation for the object, expert collaborators specializing in the object, etc.).

The intelligent integration module 135 may provide a contextual, machine learning approach to more effectively integrate applications using artificial intelligence/machine learning system 230. In leveraging the automation capabilities of machine learning, the module may eliminate or minimize additional work needed for humans, such as software developers, to author or develop new applications, or to integrate applications. Also, the need for software development resources at the user-end can be reduced, or eliminated, since many solutions can be implemented at the backend of the system (e.g., the third-party domain shown in communication environment FIG. 1A.)

Furthermore, as artificial intelligence/machine learning system 230 can automate some aspects of integration for the system 200, this may reduce the amount of details and information regarding the applications that users, such as field workers, may be required to know. For example, artificial intelligence/machine learning system 230 can passively gather details that provide task context, and utilize a knowledge base to offer relevant and critical information to the user, without the need for that user to search or be knowledgeable on performing requests for the information using the software.

According to implementations, the system 200 integrates several applications to provide the information that is required to a user in manner that is simple, intuitive, and automated. To accomplish this, the artificial intelligence/machine learning system 230 can be configured to "learn" what information is required within specific tasks and contexts. As an example, the artificial intelligence/machine learning system 230 can be integrated to a schedule service that maintains inspection schedules and inspection intervals for a device. In this case, the device may provide the data (e.g., derived from equipment identification tags, geolocation, or image recognition) and determine that an inspection procedure is required. It may then retrieve the proper inspection procedure and display that to the worker and allows them to interact with it to view steps, note completion of a step, and archive step execution or results, etc. In addition, other supporting documents for the device and the inspection procedure can be automatically retrieved and provided to the user according to their options. The result, is an ease of use with the system 200, where the user (e.g., worker) at a site can start the application, and follow instructions (e.g., point camera at tag) provided by the application. In this example, the application can guide the user through the process and provide any additional information available, eliminating the need for a user to actively search for information or learn commands.

Figure 3:
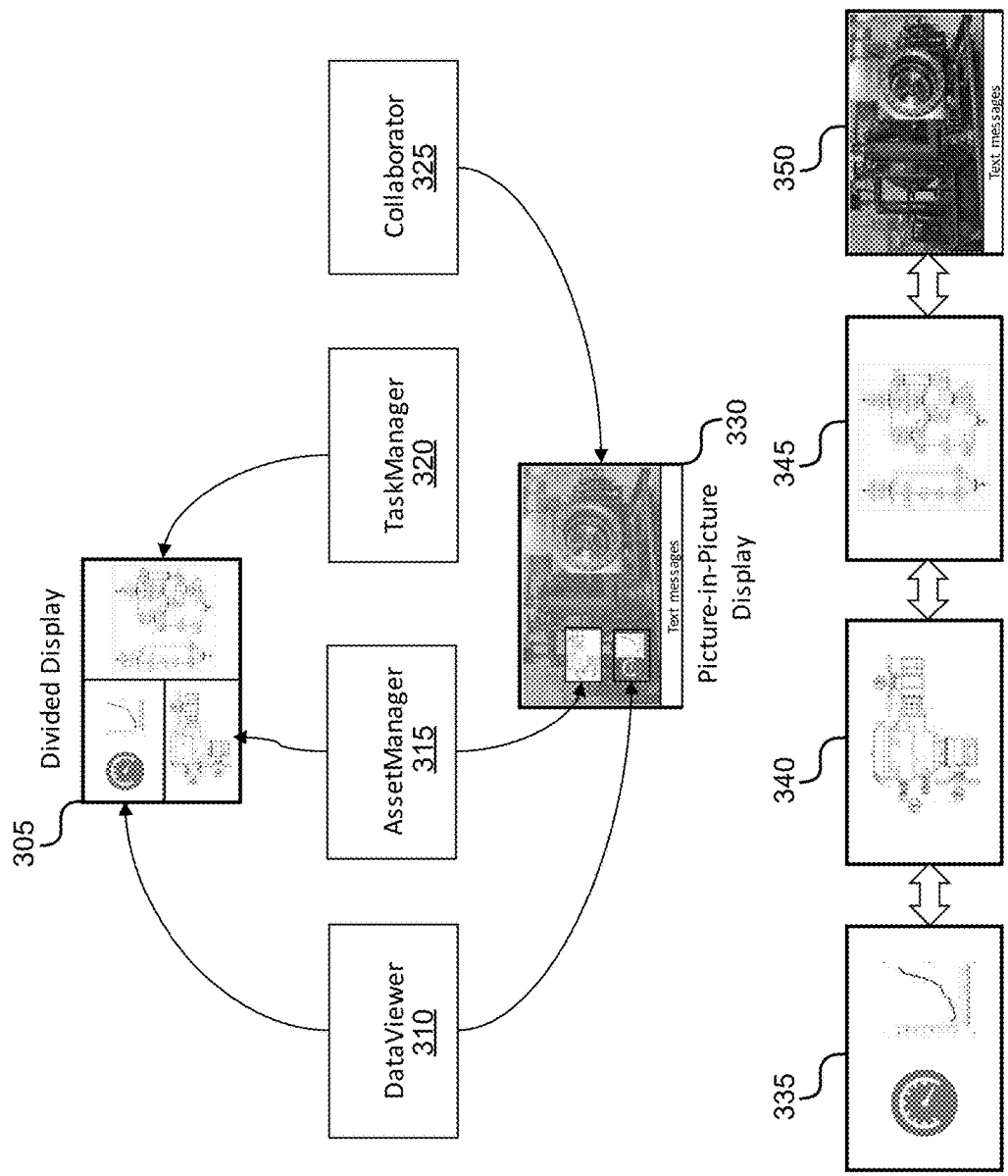
FIG. 3 is a diagram illustrating an example of components of the intelligent integration module interacting to provide multiple viewports presented in a mobile display device, for example the HMD of FIG. 1, in accordance with implementations.

FIG. 3 conceptually illustrates various components of the intelligent integration module 135 interacting to provide multiple viewports that are presented to a user using a mobile display device, for example the HMD of FIG. 1. FIG. 3 presents examples of three display options that may be implemented according to the embodiments, including: Picture in Picture, Segmented display, and alternating full screen displays. This multi-display capability allows a user to view, and interact with, information from multiple applications simultaneously, without requiring the user to exit and start each application separately. In FIG. 3, some components included in the architecture of the intelligent integration module are shown, including a DataViewer 310, assetmanager 315, taskmanager 320, and collaborator 325. Details regarding each of the aforementioned components are discussed in detail with reference to FIGS. 1B and 2.

FIG. 3 further illustrates that each of the viewports 335, 340, 345, and 350 can be represented as visual data that is aggregated in a manner allowing each of the generated images to be collectively displayed to the user (e.g., as PIP display 330 or divided display 305). A composite display can be configured in a variety of ways, in accordance with implementations. In some instances, a display is configured based on various criteria, such as user preferences and task requirements. Implementations may implement a variety of displays having different formats and configurations to present information to a user, including: full screen display from any one source, picture-in-picture, divided displays, varying levels of opacity, and varying sizes of the individual application viewport. FIG. 3 illustrates that each of the components generate an output, which may be displayed to the user in as a composite of the respective outputs. A resulting composite display, shown as divided display 305 and picture-in-picture display 330, may correspond a specified portion of the display's area to a respective output from each component.

In the example of the divided display 305, an area of the display may be divided into multiple regions, where each region displays information that has been generated by a different data source. One notable aspect of the architecture is that the underlying web management and rendering implementation, described in reference to FIG. 3 for example, can be applied to any web application (or website). In an embodiment, a database be configured as aforementioned data source, by interacting with the DataViewer 310 to perform the AI functions or workflow, etc. Referring back to the divided display 305, the DataViewer 310 output is presented in an upper left region of the display 305, the assetmanager 315 output presented in the lower left region of the of the display 305, and output from the taskmanager 320 is presented in the right half of the divided display 305. It should be appreciated that the regions of a composite display can vary in size, in a manner that allows the information from some components to be displayed more prominently to the user in comparison to information from other components. For instance, the taskmanager 320 output takes up a section of the divided display 305 (e.g., half of the display) that is larger than the regions presenting outputs from the DataViewer 310 and assetmanager 315. In an example, the ability to have multiple viewports involves having a region of a display, such as picture-in-picture display 330, that is opaque, and another region that is transparent allowing viewing of legacy data systems, and integration systems, without interfering with vision. In addition, the visions can be provided by a camera, for instance, that is directly mounted to the headset or tangentially located elsewhere. In addition to the camera being located elsewhere, the whole composite view may be shared with others using the collaborator service (e.g., Collaborator 325).

Figure 4:
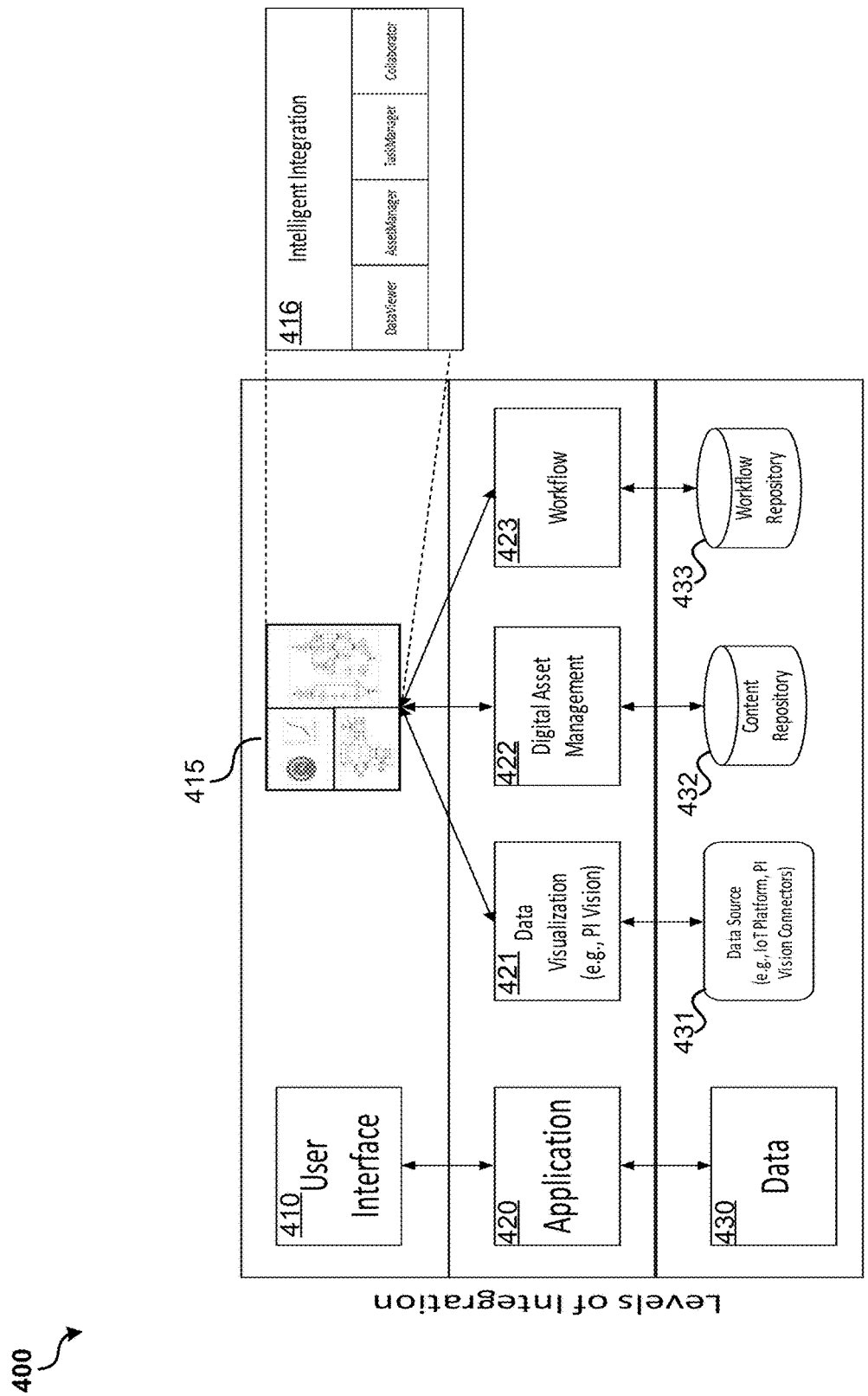
FIG. 4 is a diagram illustrating an example of the multiple levels of integration that may be implemented by the intelligent integration module, in accordance with implementations.

FIG. 4 is a diagram illustrating an example of the multiple levels of integration that may be implemented by an intelligent integration module 400, in accordance with implementations. In an embodiment, the intelligent integration module 400 executes in a mobile device, such as a mobile display device. The intelligent integration module 400 can leverage certain services supported via networked resources, such as a cloud network or data center (e.g., WebRTC and Directory Services). The intelligent integration module 400 may leverage any existing integration across applications that may already be in place.

The levels of integration in FIG. 4 include user interface level 410, application level 420, and data level 430. The data level 430 is illustrated as a first level of integration, and includes mechanisms that can be used to access and maintain data utilized by the system. As shown in FIG. 4, the data level 430 includes data source 431, content repository 432, and workflow repository 433. The application layer 420 is a second (or middle) layer of integration for the intelligent integration module 410. The application layer 420 can be generally described as a layer that supports the various capabilities implemented by the software applications of the module 400. In the example of FIG. 4, the application layer 420 is shown as implementing data visualization 421, data asset management 422, and workflow 423. The third (or top) layer of integration for the intelligent integration module is the user interface layer 410. The user interface layer 410 supports implementation of the various mechanisms which allow the user to interact with devices, and software applications associated with the intelligent integration module 400. FIG. 4 shows the example of the user interface layer 410 including a composite display 415. As discussed in greater detail with reference to FIG. 3, the display 415 presents output from components of the intelligent integration 416.

Figure 5:
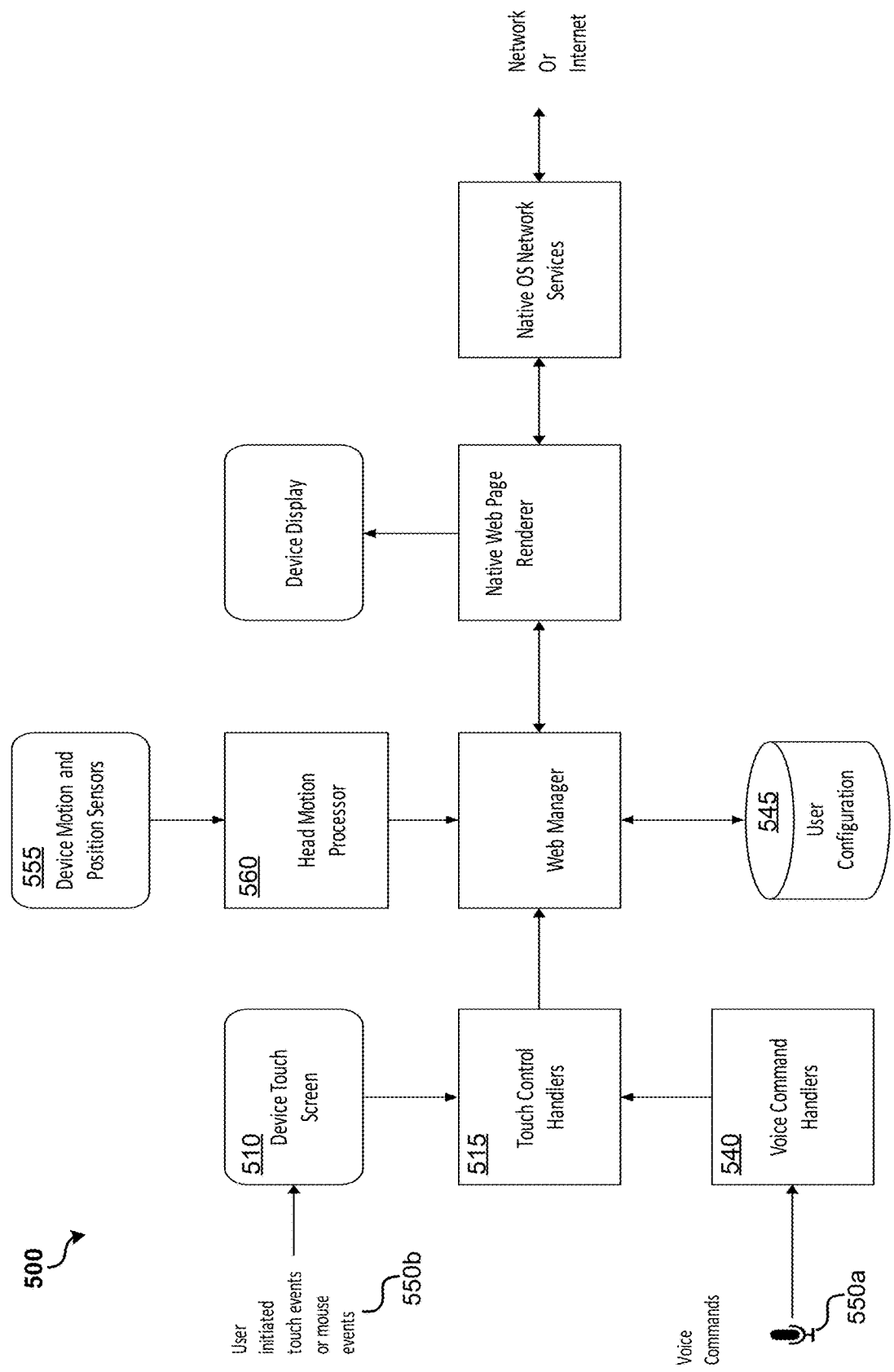
FIG. 5 is a diagram illustrating an example of user experience (UX) level integration that may be implemented by the intelligent integration module, in accordance with implementations.

FIG. 5 is a block diagram illustrating an example of user experience (UX) level integration 500 that may be implemented by the intelligent integration module, in accordance with implementations. The UX level integration 500 can include elements that implement a capability on a mobile display device, for instance HMD 140, a tablet, or some other device to render a webpage and then provide manipulation of that webpage, such as creating a viewport from a section of the webpage. The UX level integration 500 allows the user to interact hands-free, using voice commands or head motion. UX level integration 500 additionally supports haptic interactions, for example touch gestures, on devices that are configured to support touch interactions (e.g., mouse, touchscreen).

FIG. 5 illustrates that voice-driven interactions, shown as voice commands 550a received through a microphone, can be interpreted by voice command handler 540. Additionally, a touch control handler 515 can interpret various touch-driven interactions 550b, such as user-initiated touch events (in response to interacting with a device touch screen 510) or mouse events. Moreover, movement-driven interactions, such as head motion of a user that is detected using device motion and position sensors 555, are interpretable by head motion processor 560.

As shown in FIG. 5, the UX level integration 500 involves use of user configuration information that may be stored on a user configuration database 545. The user configuration database 545 can contain descriptions of specific "views" that are defined by a series of "action". An "action" can be generally described as an operation that manipulates the rendered webpage, for instance mouse events, zooming in, and the like. Information maintained in the user configuration database 545 can also describe details of the viewport, including dimensions, size, and position on the screen. As a result, a plurality of views can be defined and placed on the display to provide a UI-UX level of integration. Since a wide range of software application and services use web-based user interfaces, defining a "view" for each application or service realizes the possibility to view several distinct applications simultaneously on the display of the mobile device, and interact with these applications in accordance with implementations described herein (e.g., using motion-driven interactions, voice-driven interactions, touch-driven interactions).

Figure 6:
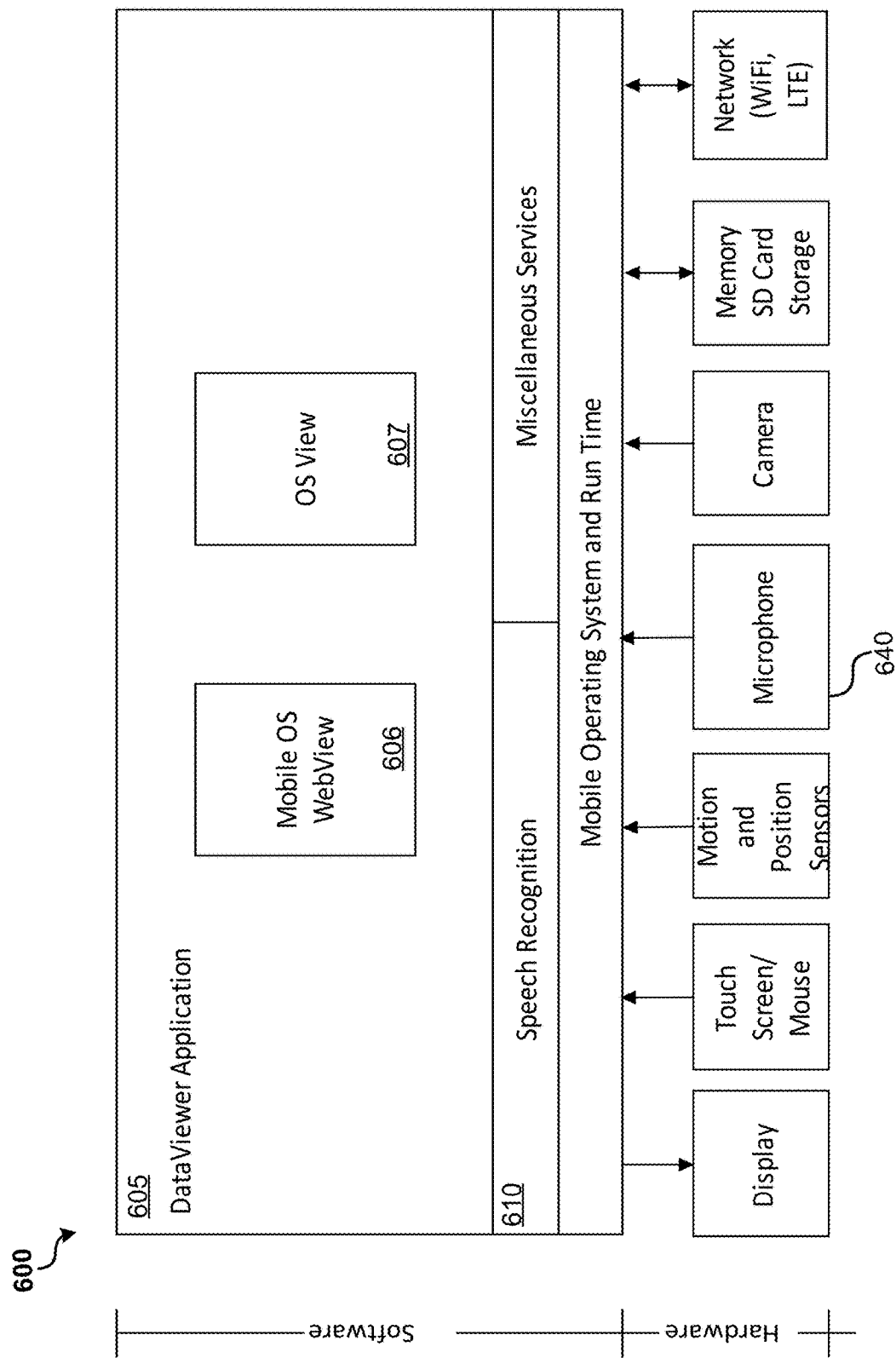
FIG. 6 is an example architecture of a system implementing a user interface application (i.e., DataViewer Application), including hardware-level and software-level components for providing an interactive web application, and incorporating voice-driven and motion-driven interactions with web content in a mobile display device, in accordance with implementations.

FIG. 6 illustrates an example architecture of a system 600 implementing a user interface application (i.e., DataViewer Application), including hardware-level and software-level components for providing an interactive web application, and incorporating voice-driven and motion-driven interactions with web content in a mobile display device, in accordance with implementations. The intelligent integration aspects of implementations include a user interface application, illustrated in FIG. 6 as DataViewer application 605. According to implementations, DataViewer application 605 implements two principal functions: 1) implementing procedures that emulate the behavior of actions defined in the controls (e.g., HTML controls and JavaScript), and associates the actions with voice commands; and 2) tracking user interaction with the web application and allowing a series of actions to be replayed to define a "view" associated with the series of actions.

The DataViewer application 605 may implement various other user interface related capabilities, including but not limited to: fine grained cursor control through head-motion; voice enablement for hands-free operation of user interactions (e.g., click, double click, drag, scroll, zoom in/out) to interact with web applications; capture and replay of user actions to navigate and create a viewport on a section of a webpage; and replay optimization that detects and can eliminate intermediate page navigation. The DataViewer application 605 can implement the logic necessary to identify haptic, or touch-driven, commands through user interface controls (e.g., buttons, links, designated regions), when a user touches a touchscreen or clicks a mouse, for example. Even further, as discussed above, the DataViewer application 605 also identifies voice-driven commands associated with the controls. In some cases, such controls may be implemented on a webpage or web app using HTML or JavaScript. However, it should be appreciated that other programming languages can be used to implement controls as deemed necessary or appropriate, and that the DataViewer application 605 may be configured to work regardless of the implemented programming/scripting language.

A mobile OS WebView 606 is illustrated in FIG. 6. In some embodiments, the mobile OS WebView is a view that displays webpages and content for web applications. In some embodiments, the mobile OS WebView 606 renders webpages using a web engine, for example WebKit, to display webpages and supports various navigation actions to manipulate, or otherwise control, the presentation of webpages (e.g., navigate forward and backward through a history, zoom in and out, perform text searches).

FIG. 6 also shows OS view 607, as a software component of system 600. The OS view 607 can be implemented as a class that represents the building blocks for user interface components. In some cases, the OS view 607 can occupy a rectangular area on the screen of a mobile display device, and implements functions such as drawing and event handling.

Speech Recognition 610 is also shown as a software component of system 600. The speech recognition 610 can receive a user's voice input (i.e., digitized speech) as an input, for example from microphone 640. Subsequently, speech recognition software 610 can process the user's speech to extract text. In an embodiment, the speech recognition software is implemented using engines known in the art. For example, natural language understanding (NLU) software development kits (SDK) such as API.AI SDK, CMU Sphinx, and the like may be used.

Accordingly, the speech recognition software 610 may extract keywords from the text (e.g., using an automated speech recognition engine in conjunction with the NLU) which can be further used to recognize certain voice commands that are supported by the DataViewer application 605. In some implementations, recognizing voice commands includes leveraging existing voice enabled technology, for instance using WearHF to associate voice commands with controls. Furthermore, metadata recognizable by WearHR may be incorporated into user interface components in order to optimize the UI for voice-driven interactions.

FIG. 7A an operational flow diagram illustrating an example process 700 that may be implemented by intelligent integration module 135 to incorporate voice-driven, motion-driven, and touch-driven interactions with web content in a mobile display device. At operation 710, a user interaction is received as input. The user interaction can be conveyed in multiple forms, including a mouse click, touching a button displayed on a touchscreen device, head motion, or a voice command. At decision block 715, it is determined whether the input received from the user interaction is relating to touch, voice, or motion. In the case where the input is in response to a haptic interaction (e.g., mouse click, touch screen), the process 700 proceeds to operation 725. Alternatively, in the case where the input is in response to a voice command or head motion, the process continues to 720.

At operation 725, a haptic interaction, can be interpreted by the OS. In some cases, the user interaction can be interpreted by a mouse/touch handler that generates an OS defined control. For example, a user clicking a mouse can be interpreted as a click control by the OS.

Next, at operation 726, an event is generated for the OS defined control. For example, as discussed above with reference to DataViewer 170, when the OS detects a mouse click, an event (including the coordinates of the mouse click, and the action) may be generated. Subsequently, at operation 727, the control event may be passed to the renderer. Passing the event can involve calling an API associated with the renderer to transfer the event information.

Referring back to operation 720, a voice-driven or motion-driven interaction may be interpreted and an associated OS defined control corresponding to the interaction may be emulated. As an example, a voice command of "click" can be received via a microphone on a HMD, and interpreted by RealWear HF or other suitable application that may associate the voice command with a web-based control. Based on the interpreted command, an OS defined control corresponding to "click" may be determined and then emulated. For example, the voice command of "click" may emulate a click of a mouse.

Subsequently, at operation 721, emulation of an OS defined control is achieved by generating an emulation event including the same information that would be included in the corresponding event created by the OS. In continuing with the example, a "click" control is emulated by generating an emulation event that includes information similar to the information contained in an OS defined event. In the example of a click, both the emulation event and the OS defined event may include the current cursor coordinates, and the click action description (mouse down, mouse up). Next, at operation 722, the emulation event is passed to the renderer.

At operation 730, a software procedure associated with the control event, or emulation control event, is executed by the renderer. According to implementations, the renderer does not distinguish whether the event came from the OS, or from the DataViewer emulating an OS event, for example. The renderer executes the software procedure in the same manner in both instances, and responds based on the defined actions. As a result, at operation 735, the renderer can render the content based on the control, as a response to the user's interaction. Again, reference is made to the "click" example. If the user were to speak the voice command "click" while the cursor is currently over a hyperlink, the renderer can generate the webpage referenced by the link. Process 700 ends, at operation 740, by outputting the rendered content to the display device, for example a HMD.

FIG. 7B is an operational flow diagram illustrating an example process 750 that may be implemented by the intelligent integration module to provide action replay optimization. According to an embodiment, DataViewer tracks a user interaction with a web application, and captures the actions the user executes to permit them to be repeated. The process 750 begins at operation 760, where tracking of the user interactions is initiated. In some cases, tracking is initiated in response to a user interaction associated with the feature. For example, a user can issue a voice command "start view" that beings the process 150.

Next, at operation 765, the system receives a first user interaction while tracking is enabled. The received user interaction is processed by the system, and results in an interaction with web application, or its provided content. The received user interaction is processed in accordance with the process described in FIG. 7A.

At operation 770, a reference to a webpage and series of actions associated with the user interaction is saved. In some instances, the reference to the webpage is a Universal Resource Locator (URL), which is stored. The associated "action" that retrieves the webpage, via the reference, may be called "Load URL". For example, while on a home page, multiple UI actions may be performed by the user. After the homepage is loaded, the user may interact with the loaded homepage by zooming in, and then scrolling, and then clicking to navigate to another page. The aforementioned series of commands, which include load URL, zoom in, and scroll, and click will be associated with the homepage, and then stored. In implementations, an application, for instance the web application, has internal storage that persists through starting and stopping the application. Accordingly, saving can involve storing the webpage and corresponding actions to a storage of the application.

At decision block 775, it is decided whether the user is disabling tracking or continuing to track subsequent user interactions. Referring back to the "start view" command example, an associated "save view" voice command can serve to end tracking. If it is determined that tracking is disabled (i.e., YES), then the process 750 proceeds to operation 780 and tracking ends. Otherwise, tracking remains enabled (i.e., NO), and process 750 returns to operation 765. Consequently, the system receives a next interaction from the user. Operations 765-775 of process 750 are shown as an iterative sub-process, which continues to receive interactions, and store information relating to tracking those interactions, for the duration lasting until tracking is disabled.

After tracking ends, at operation 785, the series of saved actions are associated with a defined view. Thus, the system allows the actions to be repeated, or replayed, to navigate and create a viewport on a section of a webpage, for example. Thereafter, the view is defined, and can be associated with an interactive visual cue, for instance a button, that will execute the series of stored actions. In some instances, other mechanisms for identifying and retrieving a defined view can be used, such as a voice command or name.

At operation 790, replay of the defined view can be initiated. Referring to the aforementioned example of generating a button, the user can click, or otherwise interact with that button to initiate replay action to generate the view. As another example, a user can speak a name given to a defined view. The system can interpret the view's name, as a voice-enabled command that initiates replay for the view. The process ends at operation 795, where the content is rendered based on the view. The stored series of actions can be executed to create a defined viewport. In some instances, rendering the content involves replay optimization. According to this embodiment, navigation to intermediate pages (to reach the desired end page) is eliminated, thereby reducing the amount of content rendered and optimizing the overall process.

Figure 8A:
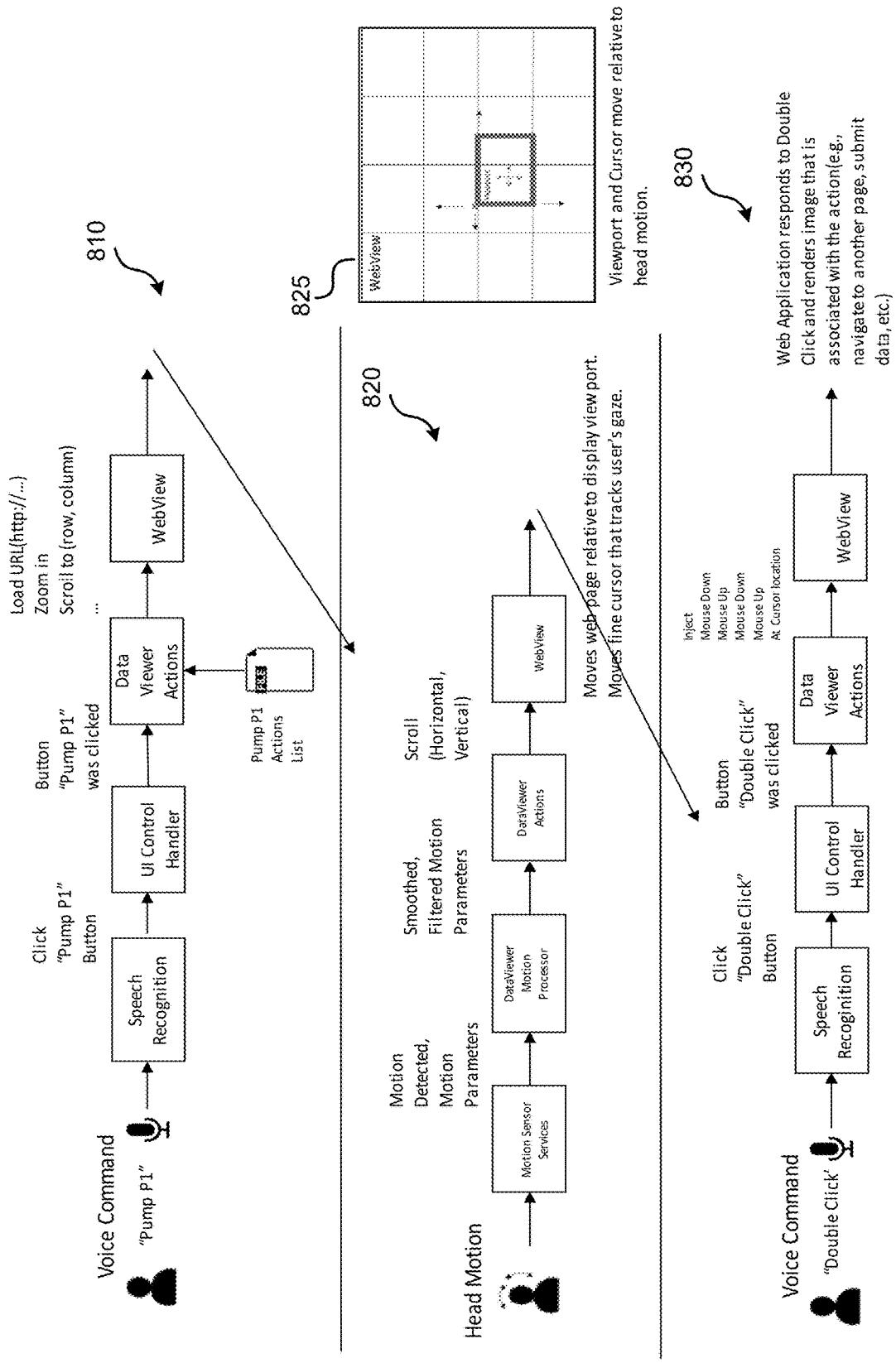
FIG. 8A is a flow diagram illustrating an example of the flow between components of the intelligent integration module that may be implemented to incorporate voice-driven, motion-driven, and touch-driven interactions with web content in a mobile display device, in accordance with implementations.
Figure 8B:
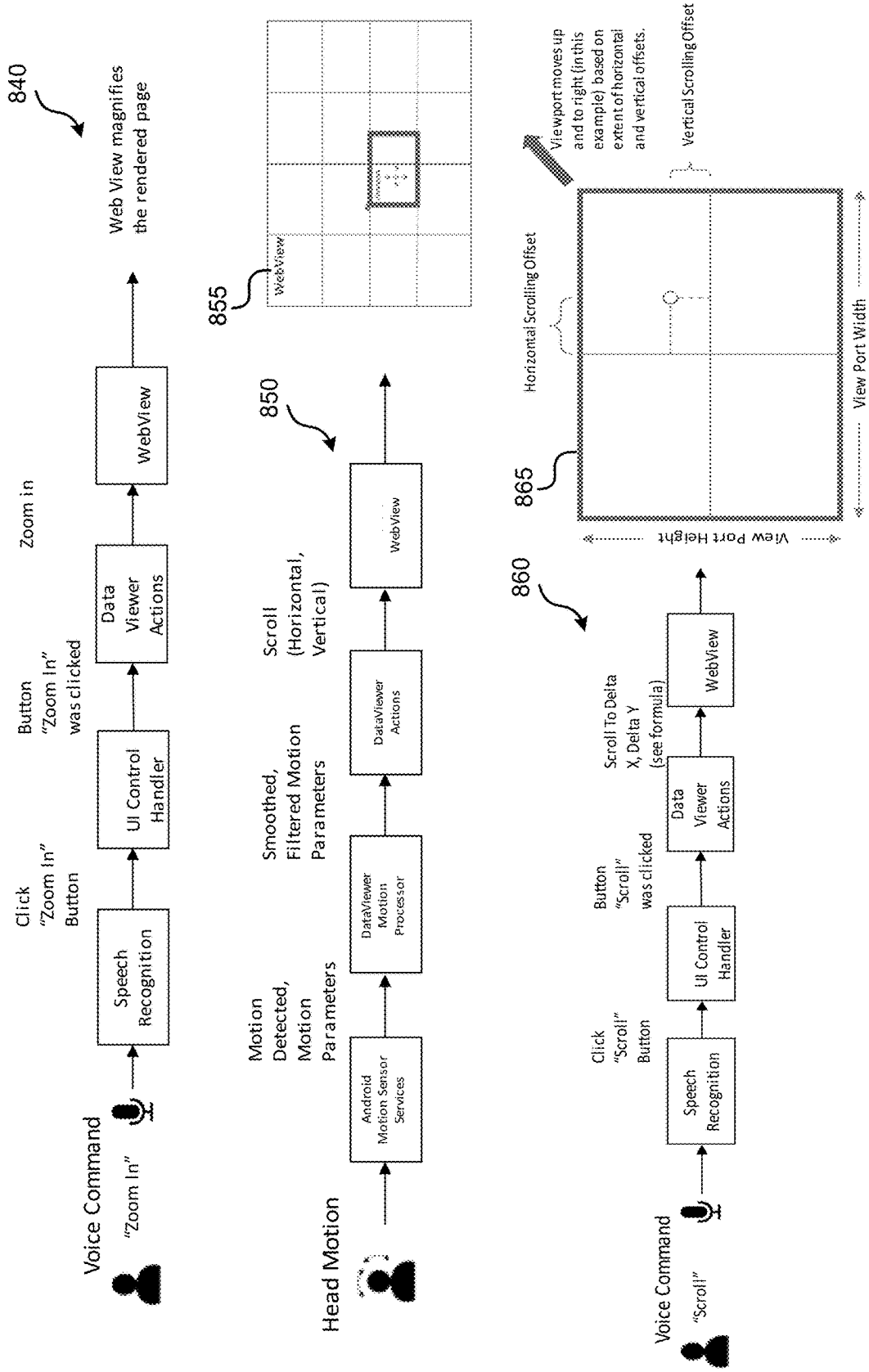
FIG. 8B is a flow diagram illustrating another example of the flow between components of the intelligent integration module that may be implemented to incorporate voice-driven, motion-driven, and touch-driven interactions with web content in a mobile display device, in accordance with implementations.

FIGS. 8A-8B are flow diagrams illustrating examples of the flow between components of the intelligent integration module that may be implemented to incorporate voice-driven, motion-driven, and touch-driven interactions with web content in a mobile display device, in accordance with implementations. In FIG. 8A, flow 820 illustrates an example voice command "pump P1", which results in loading a page associated with the pump P1, and executing any actions (e.g., zoom, scroll, etc.) that may have been used to create the desired view. Flow 820 illustrates an example of a head motion interaction, which results in moving the viewport 825 and cursor relative to the sensed head movement. Flow 830 illustrates the example of a voice command "double click". As a result of the voice command, the web application responds to a "double click" and renders an image that is associated with the action (e.g., navigate to another page, submit data, etc.).

Now referring to FIG. 8B, flow 840 illustrates an example of a "zoom in" voice command, where a renderer, for instance WebView, magnifies the rendered page. Flow 850 illustrates the example of head motion interaction. In this example, the head motion results in a fine-grained control from the user positioning the cursor relative to the center. Additionally, the closer to the center the cursor is positioned when the scroll command is issued, the smaller the movement of the page across the viewport.

Flow 860 illustrates the example of a scroll voice command, which results in the viewport 865 moving up and to the right, based on the extent of the horizontal and vertical offsets.

Figure 9A:
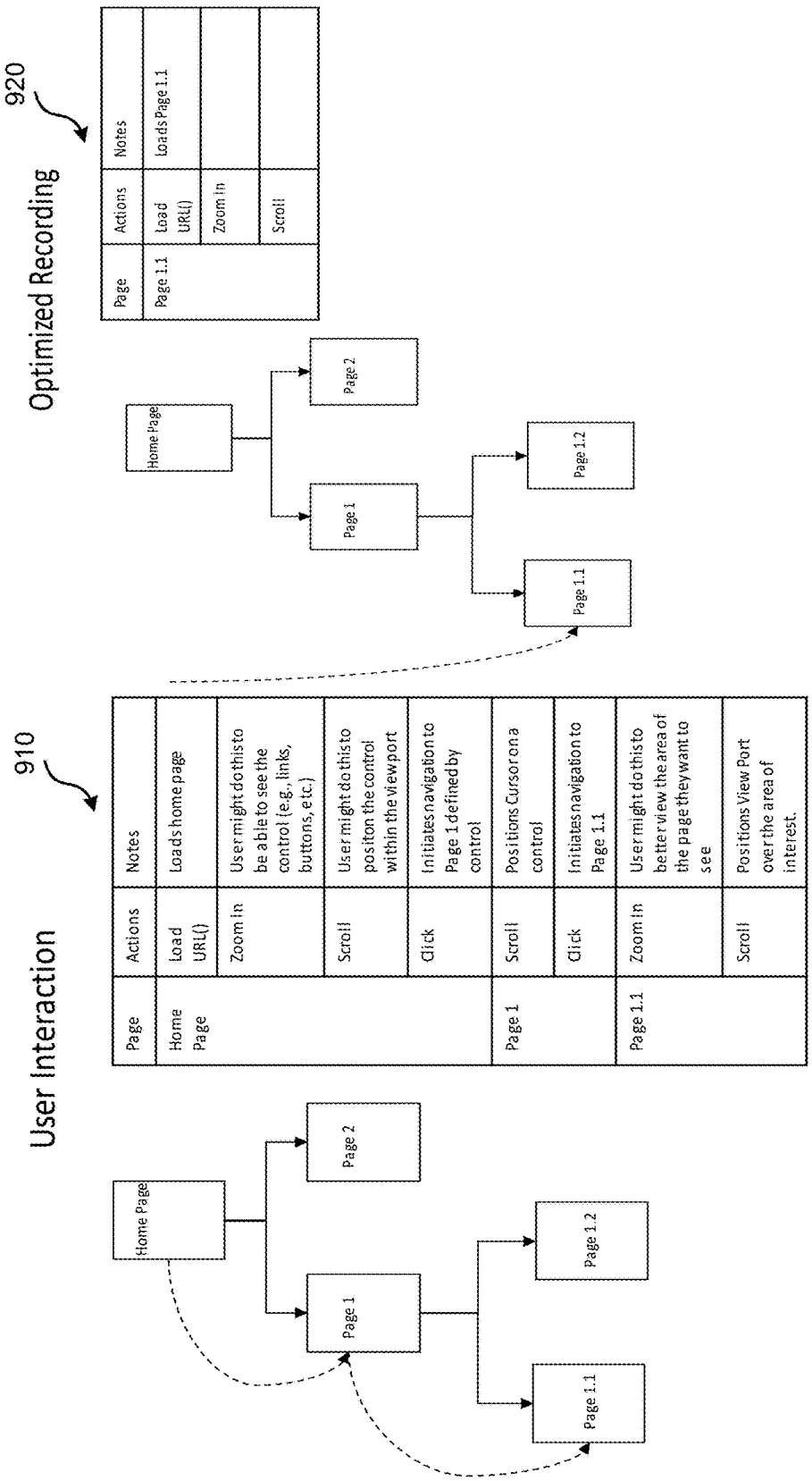
FIG. 9A is a diagram illustrating an example of actions recorded in processes that may be implemented to provide action replay optimization, in accordance with implementations.
Figure 9B:
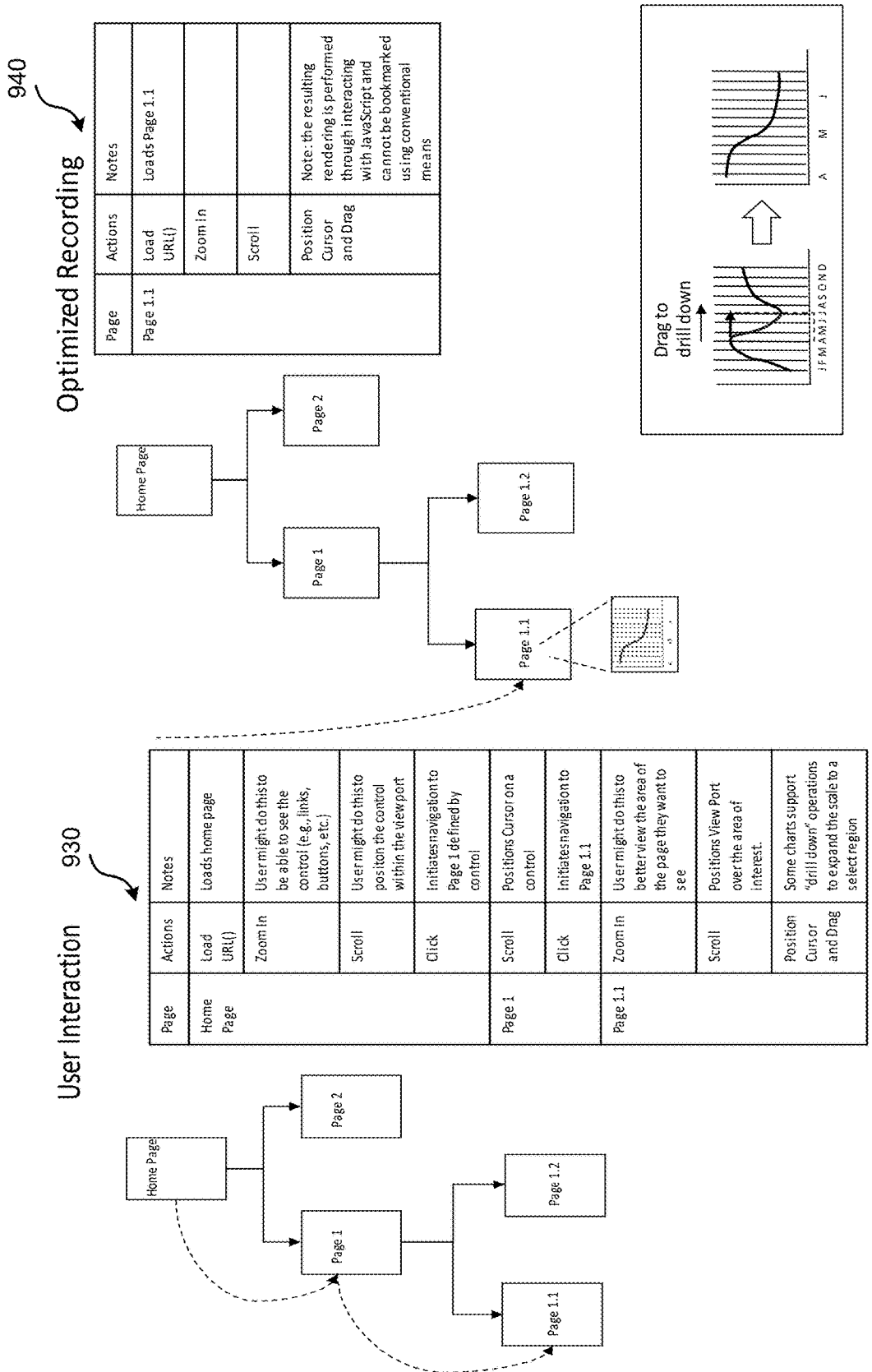
FIG. 9B is a diagram illustrating another example of actions recorded in processes that may be implemented to provide action replay optimization, in accordance with implementations.

FIGS. 9A-9B are diagrams illustrating examples of actions recorded in processes that may be implemented to provide action replay optimization, in accordance with implementations. Specifically, FIG. 9A shows navigation across several pages in a web app or website, and conceptually illustrates the capability to optimize replay only the essential actions, in this case, going directly to the desired page.

FIG. 9B illustrates that the replay optimization capability can manage reducing page navigation (which can typically be handled by a web browser bookmark, except for zooming and scrolling actions). For instance, in the case of dynamic web displays, and in this a case a line chart, the actions to "drill down" into a more detailed chart can be captured and optimized.

Figure 10A:
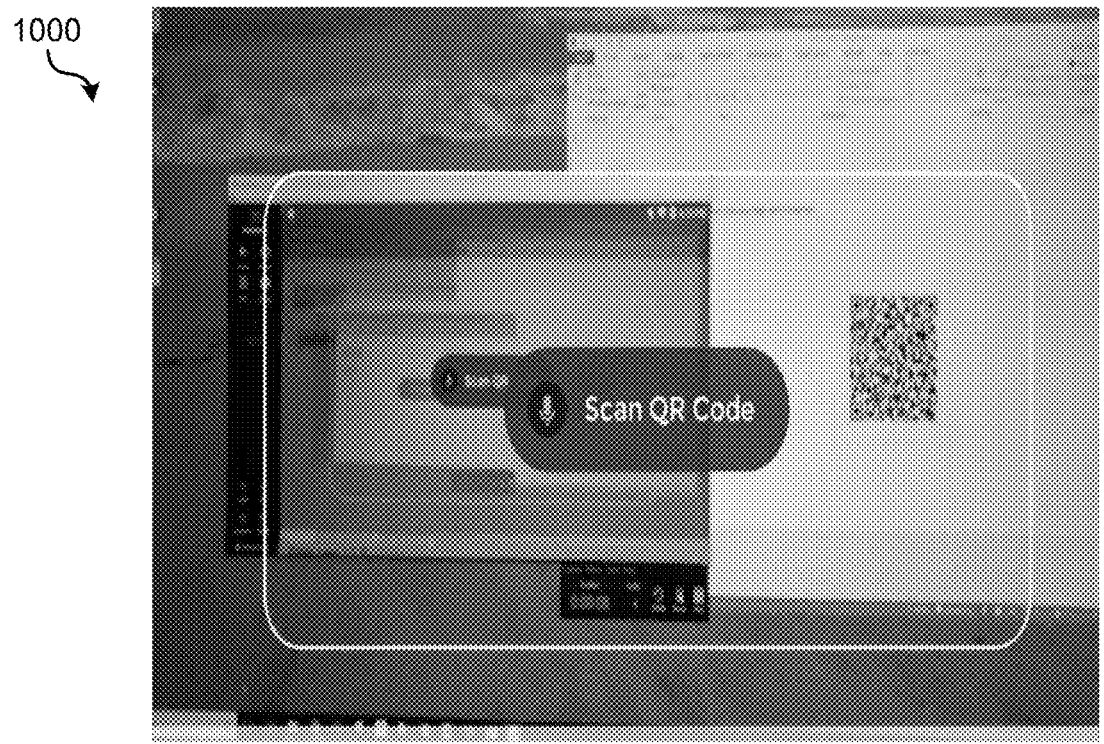
FIG. 10A illustrates an example of a displayed screen from an interactive web application presented on a mobile display device, for example a HMD, in which embodiments disclosed herein for providing voice-driven interactions may be implemented.
Figure 10B:
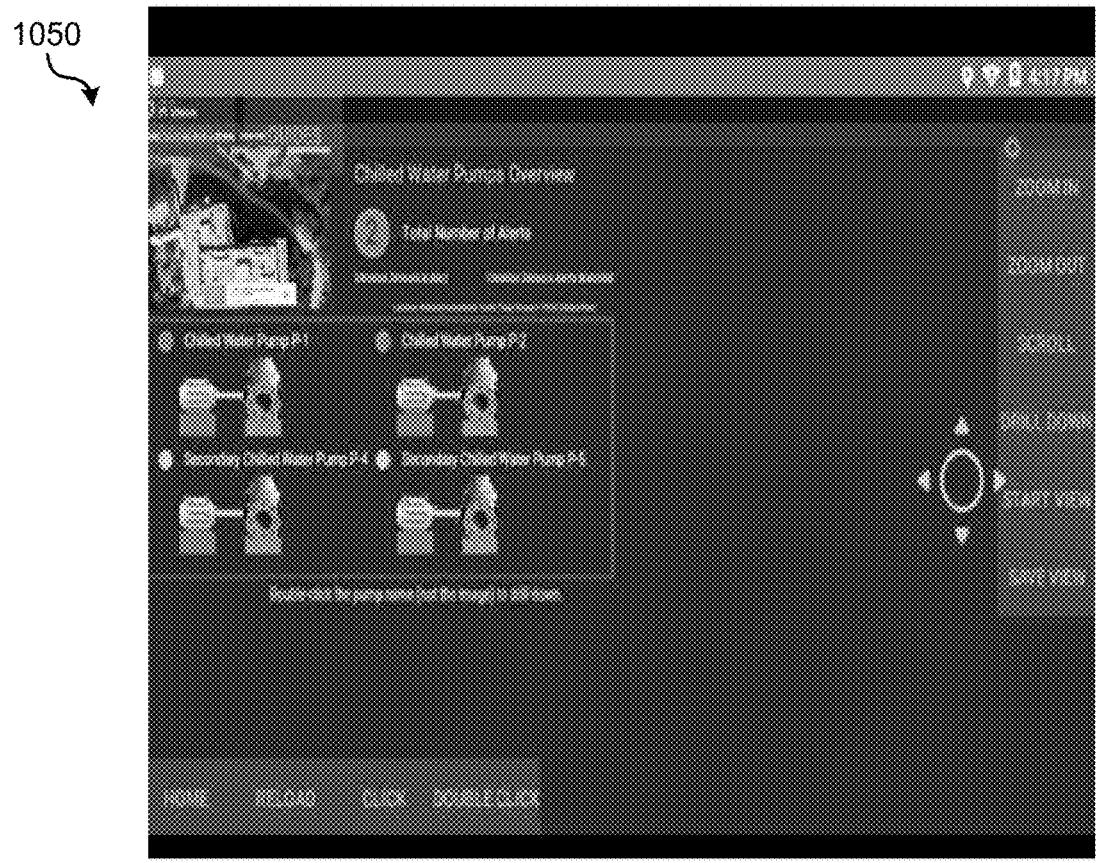
FIG. 10B illustrates another example of a displayed screen from an interactive web application presented on a mobile display device, for example a HMD, in which embodiments disclosed herein for providing voice-driven interactions may be implemented.
Figure 11A:
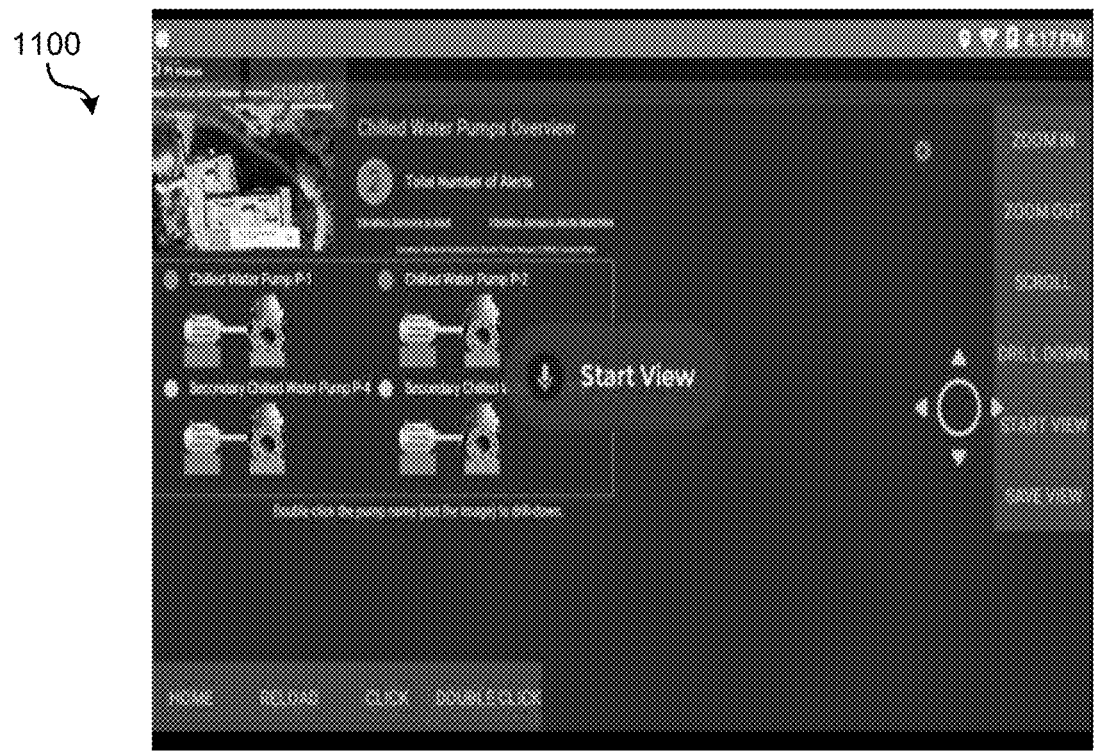
FIG. 11A illustrates an example of a displayed screen from an interactive web application presented on a mobile display device, for example an HMD, such as an initial screen for providing action replay optimization, according to an implementation.
Figure 11B:
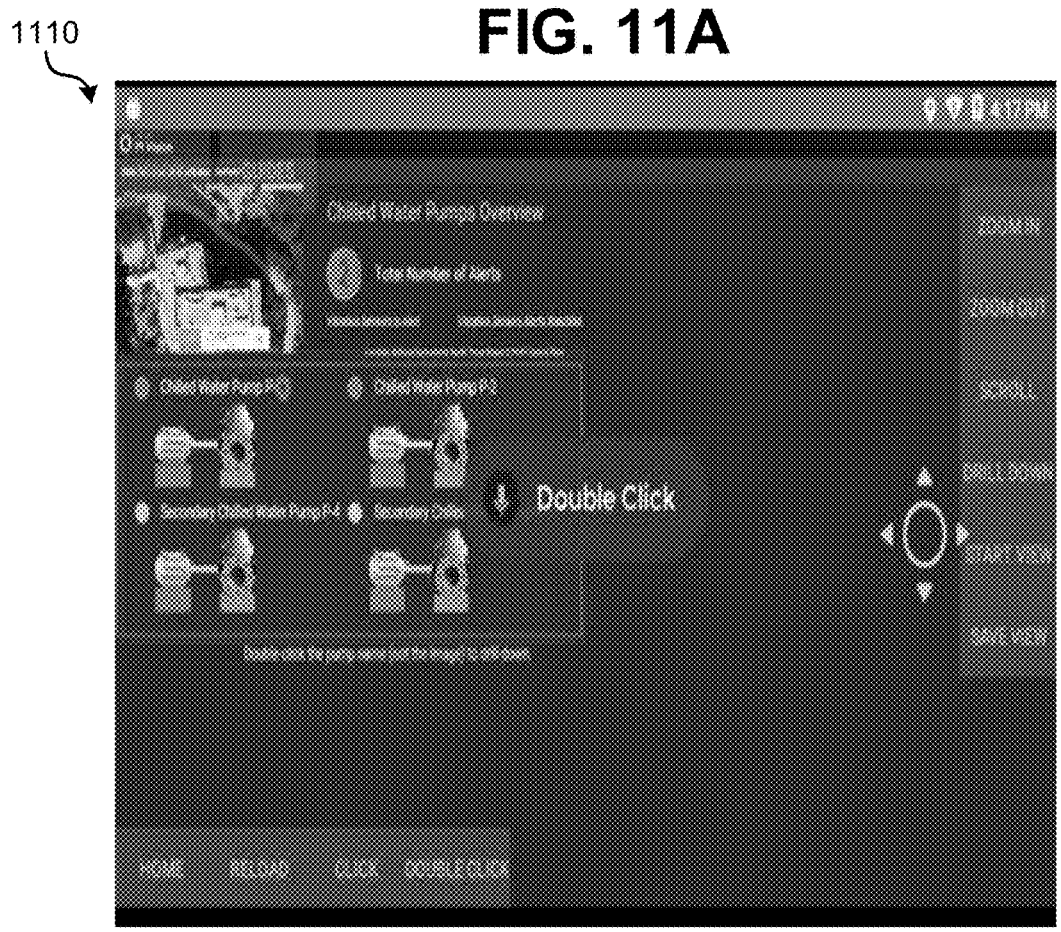
FIG. 11B illustrates an example of another displayed screen from an interactive web application presented on a mobile display device, such as a screen subsequent to the screen of FIG. 11A in a series of screens that may be displayed during action replay optimization, according to an implementation.
Figure 11C:
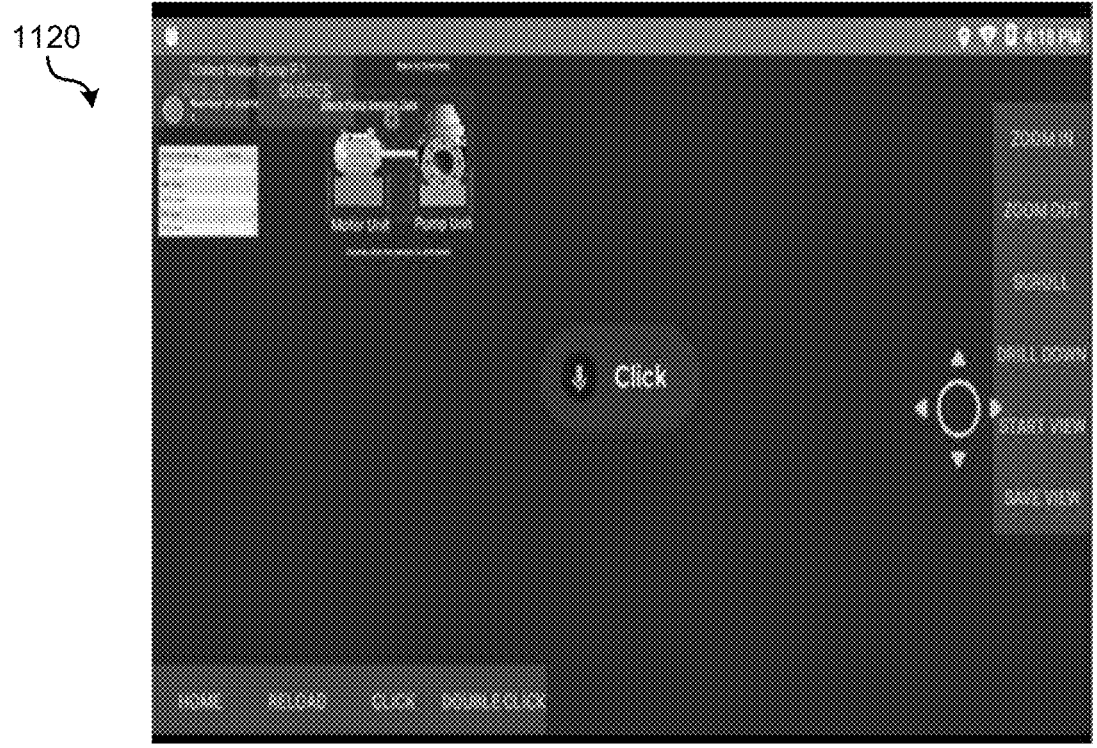
FIG. 11C illustrates an example of yet another displayed screen from an interactive web application presented on a mobile display device, such as another screen subsequent to the screens of FIGS. 11A-11B in a series of screens that may be displayed during action replay optimization, according to an implementation.
Figure 11D:
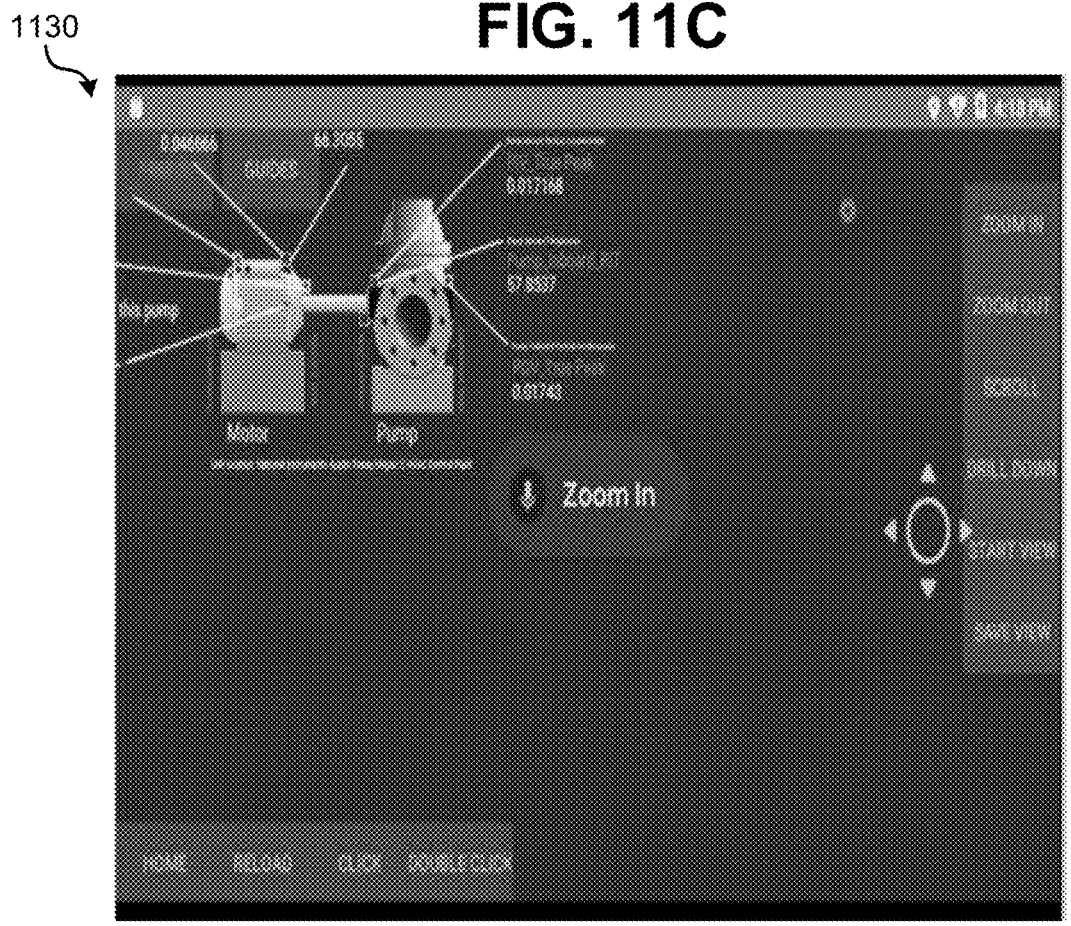
FIG. 11D illustrates an example of yet another displayed screen from an interactive web application presented on a mobile display, such as another screen subsequent to the screens of FIGS. 11A-11C in a series of screens that may be displayed during action replay optimization, according to an implementation.
Figure 11E:
FIG. 11E illustrates an example of yet another displayed screen from an interactive web application presented on a mobile display device, such as another screen subsequent to the screens of FIGS. 11A-11D in a series of screens that may be displayed during action replay optimization, according to an implementation.
Figure 11F:
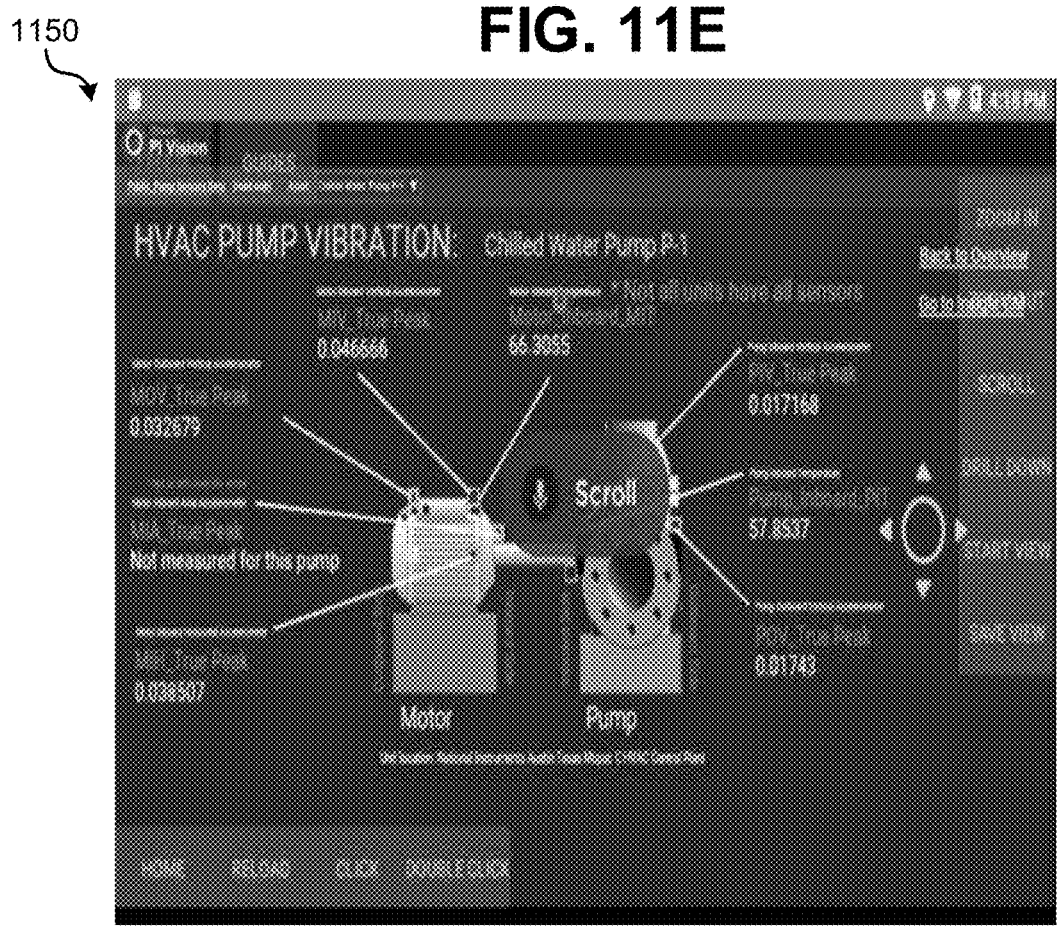
FIG. 11F illustrates an example of yet another displayed screen from an interactive web application presented on a mobile display device, such as another screen subsequent to the screens of FIGS. 11A-11E in a series of screens that may be displayed during action replay optimization, according to an implementation.
Figure 11G:
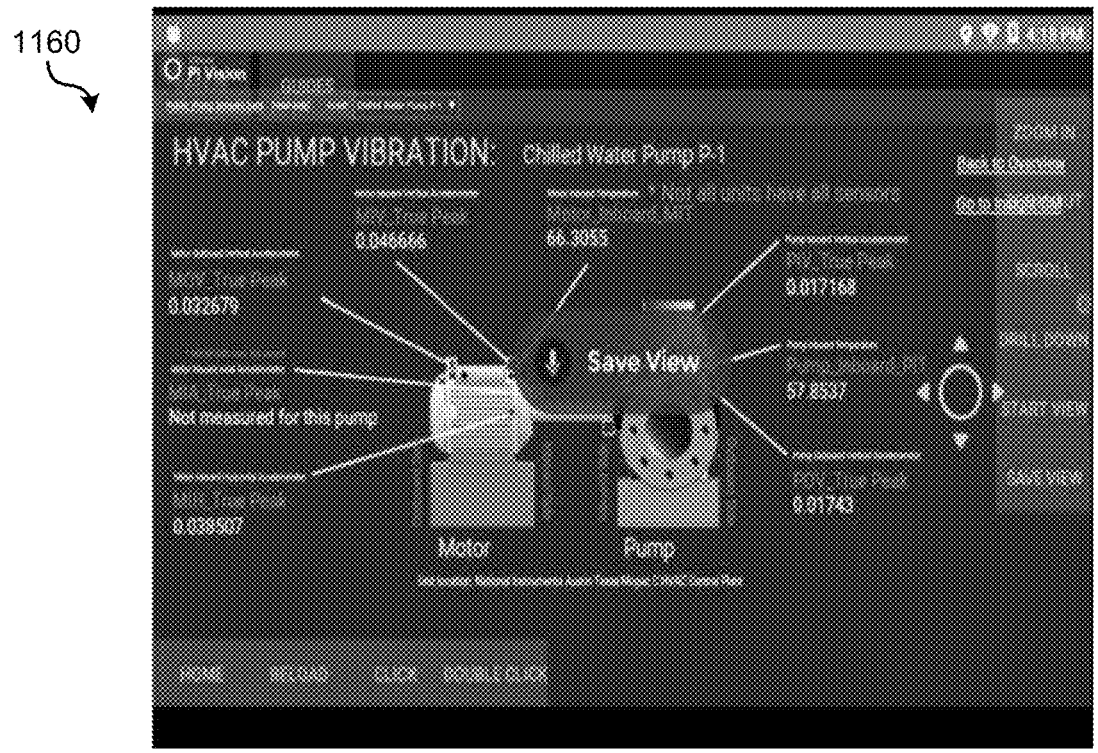
FIG. 11G illustrates an example of yet another displayed screen from an interactive web application presented on a mobile display device, such as another screen subsequent to the screens of FIGS. 11A-11F in a series of screens that may be displayed during action replay optimization, according to an implementation.
Figure 11H:
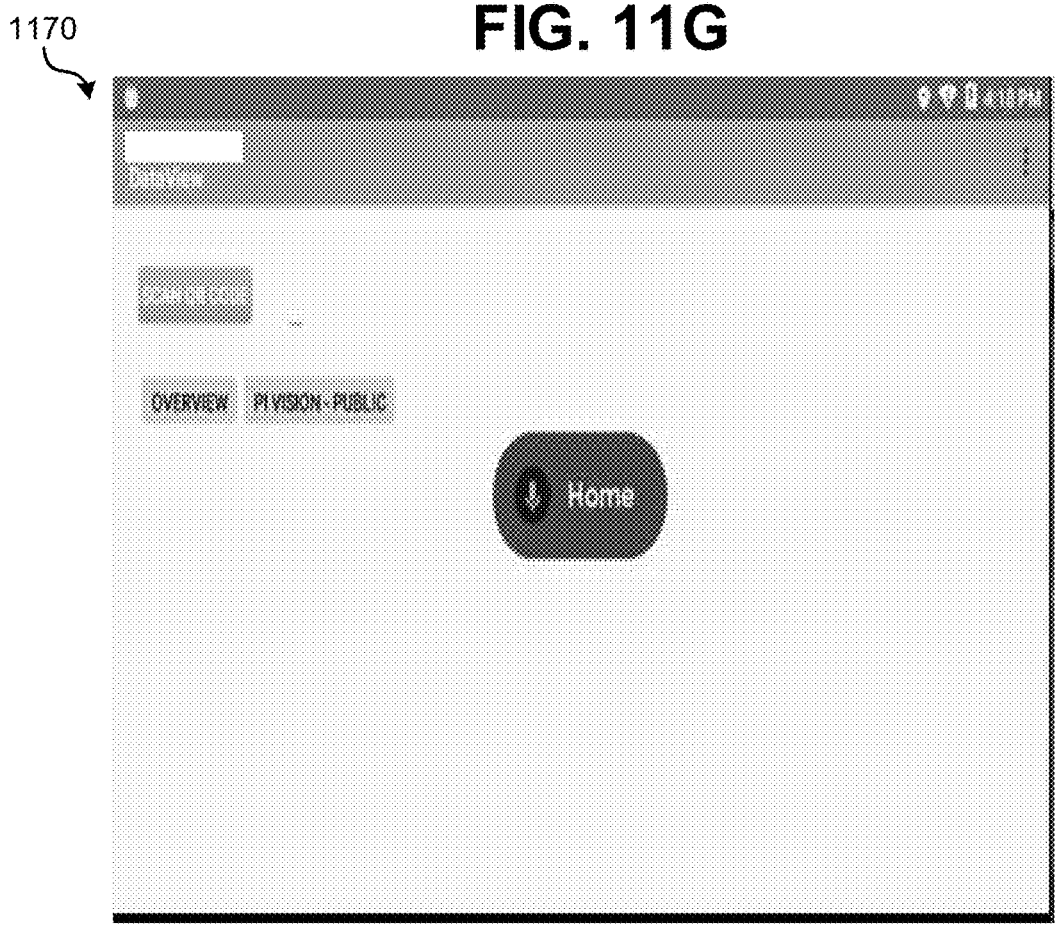
FIG. 11H illustrates an example of yet another displayed screen from an interactive web application presented on a mobile display device, such as another screen subsequent to the screens of FIGS. 11A-11G in a series of screens that may be displayed during action replay optimization, according to an implementation.
Figure 11I:
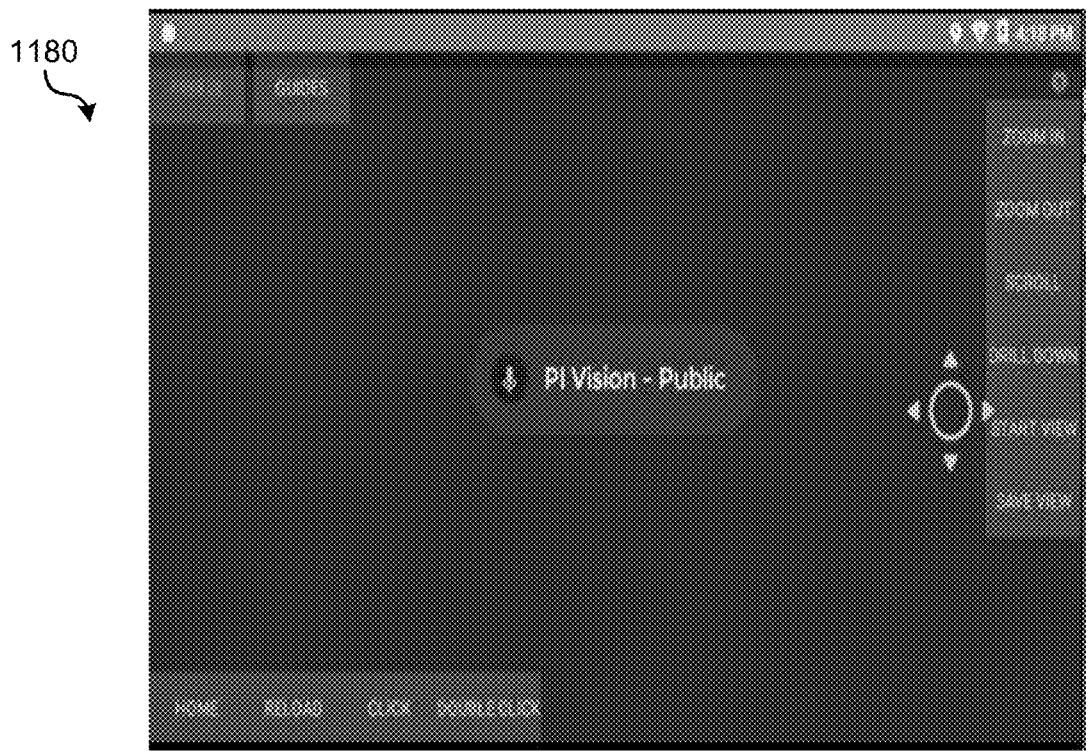
FIG. 11I illustrates an example of yet another displayed screen from an interactive web application presented on a mobile display device, such as another screen subsequent to the screens of FIGS. 11A-11H in a series of screens that may be displayed during action replay optimization, according to an implementation.
Figure 11J:
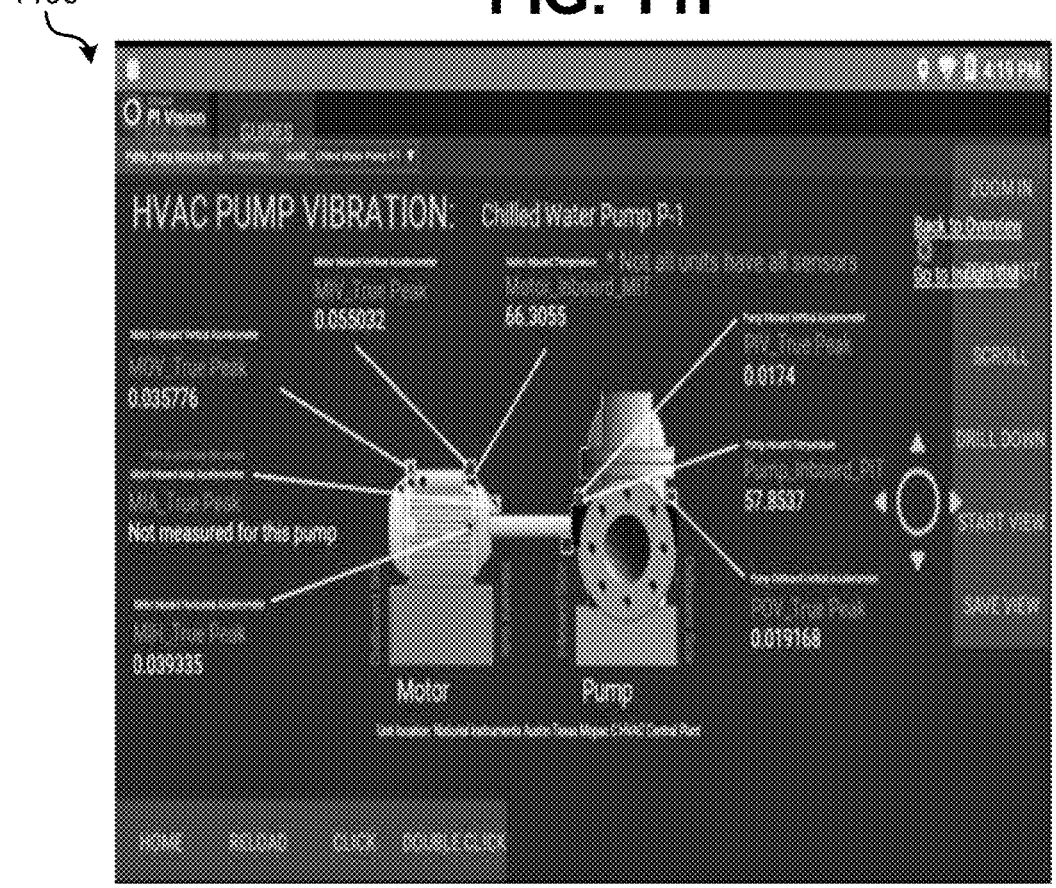
FIG. 11J illustrates an example of yet another displayed screen from an interactive web application presented on a mobile display device, such as another screen subsequent to the screens of FIGS. 11A-11I in a series of screens that may be displayed during action replay optimization, according to an implementation.

FIGS. 10A-10B illustrate examples of displayed screens from an interactive web application presented on a mobile display device, for example a HMD, in which embodiments disclosed herein for providing voice-driven interactions may be implemented.

FIGS. 11A-11J illustrate examples of displayed screens from an interactive web application presented on a mobile display device, for example a HMD, in which embodiments disclosed herein for providing action replay optimization may be implemented.

Figure 12A:
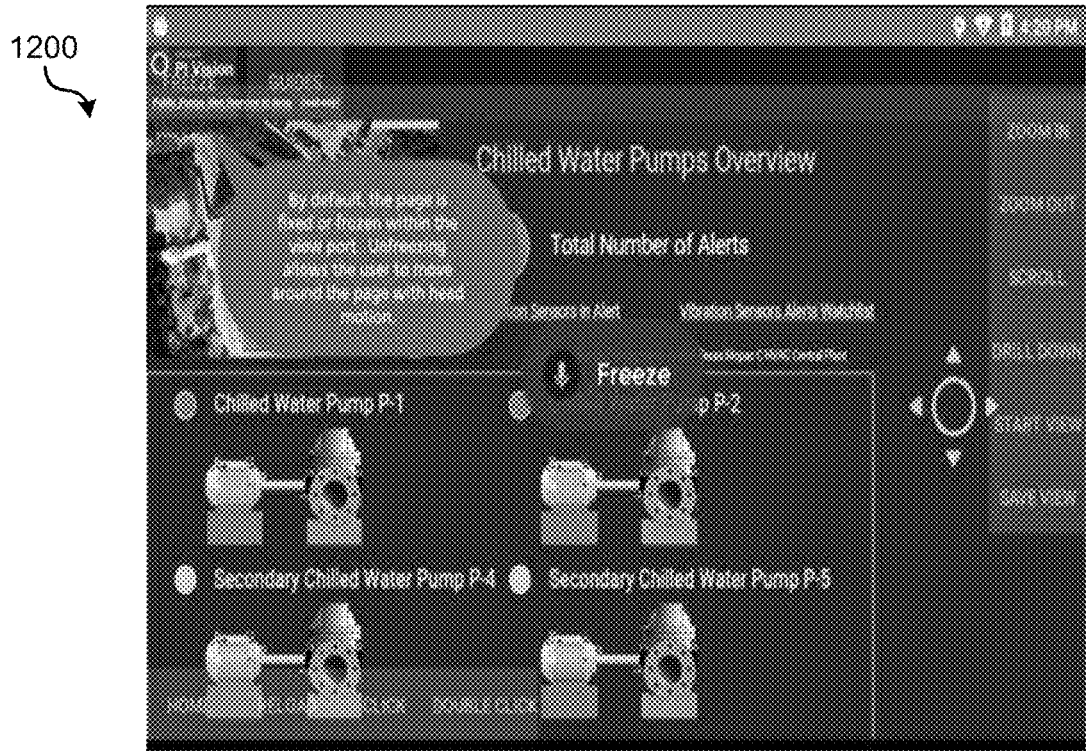
FIG. 12A illustrates an example of a displayed screen from an interactive web application presented on a mobile display device, in which embodiments disclosed herein for providing voice-driven and motion-driven interactions may be implemented.
Figure 12B:
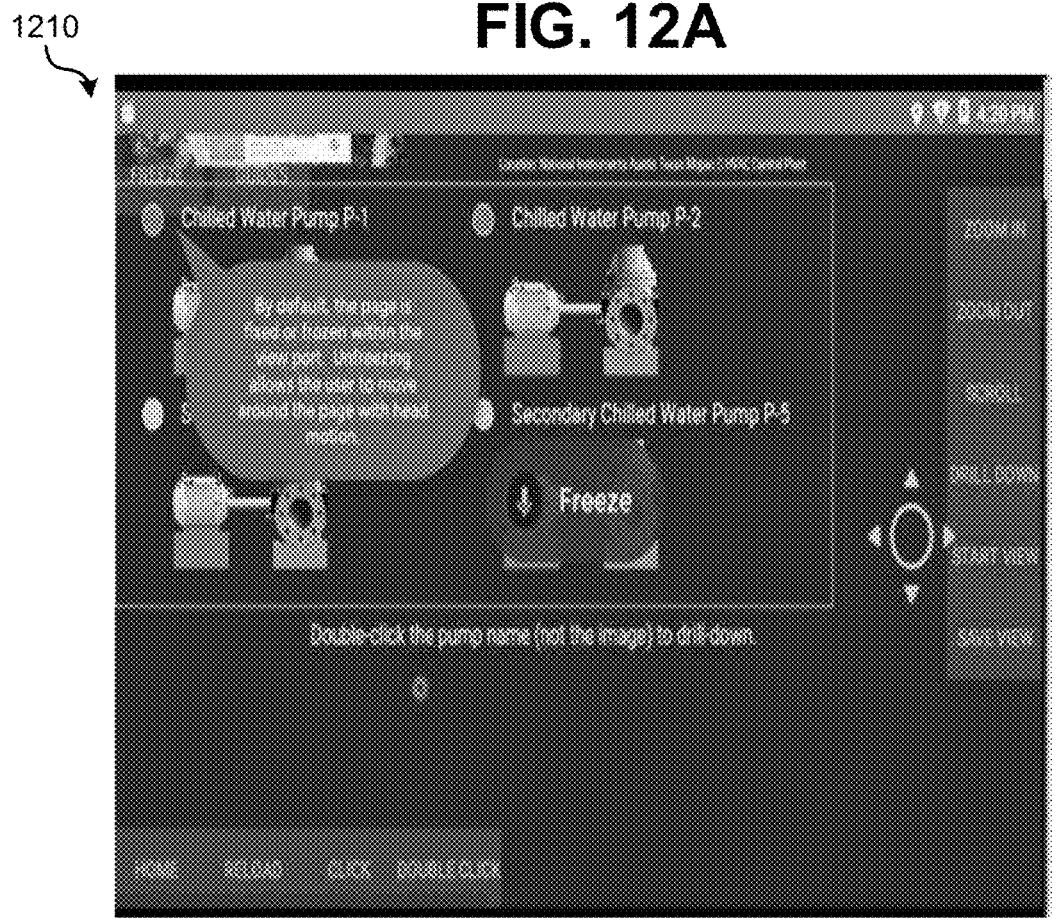
FIG. 12B illustrates an example of another displayed screen from an interactive web application presented on a mobile display device, for example a HMD, in which embodiments disclosed herein for providing voice-driven and motion-driven interactions may be implemented.
Figure 12C:
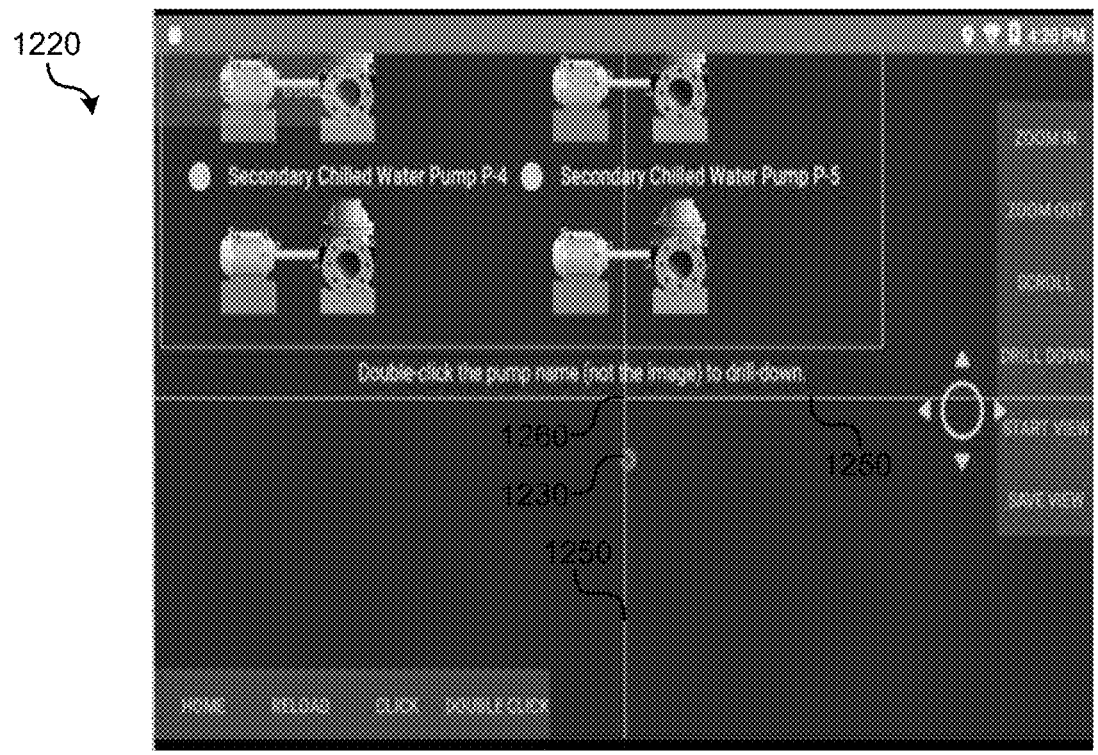
FIG. 12C illustrates an example of yet another displayed screen from an interactive web application presented on a mobile display device, for example a HMD, in which embodiments disclosed herein for providing voice-driven and motion-driven interactions may be implemented.
Figure 12D:
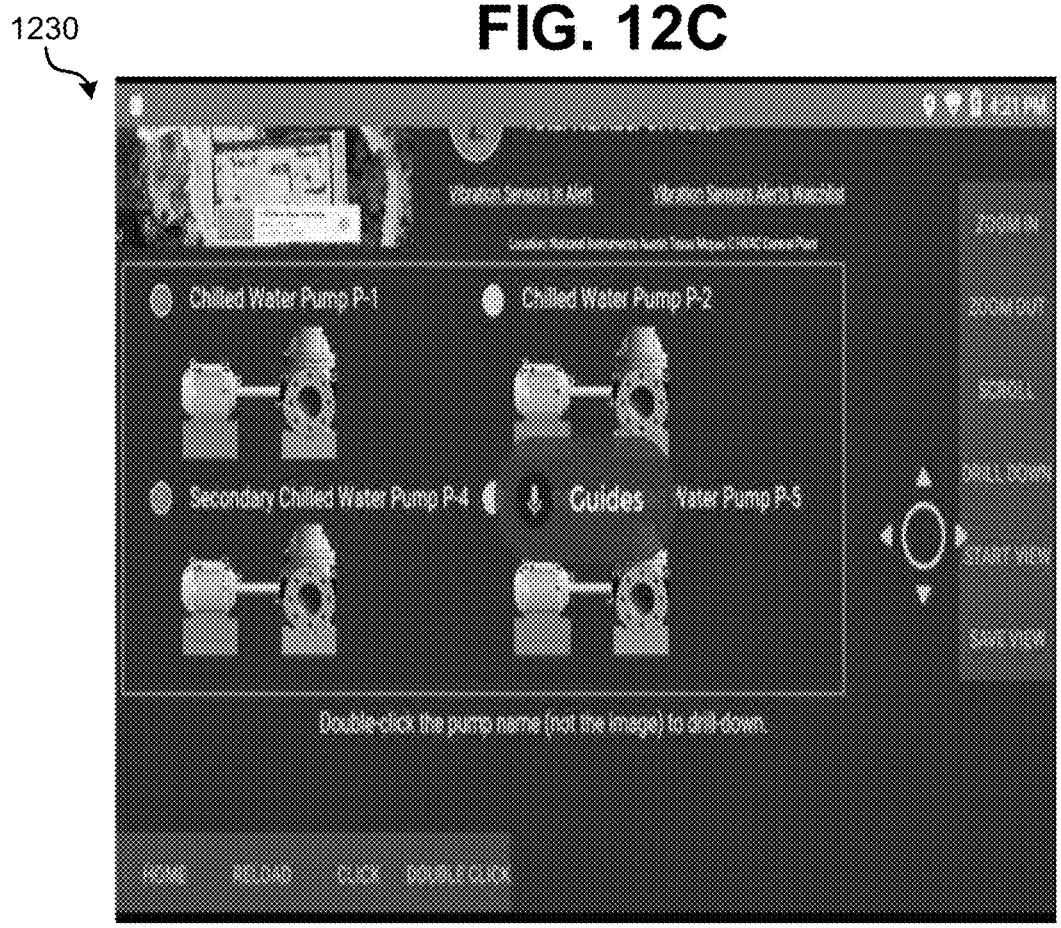
FIG. 12D illustrates an example of yet another displayed screen from an interactive web application presented on a mobile display device, for example a HMD, in which embodiments disclosed herein for providing voice-driven and motion-driven interactions may be implemented.

FIGS. 12A-12D illustrate examples of displayed screens from an interactive web application presented on a mobile display device, for example a HMD, in which embodiments disclosed herein for providing voice-driven and motion-driven interactions may be implemented. As illustrated in the example of FIG. 12C, gridlines or guidelines 1250 may be temporarily displayed (e.g., enabled/disabled by voice command such as "guidelines") to adjust a user's panning navigation speed (e.g., up, down, left, right) through the rendered web app by a positioning a cursor control 1230 relative to gridlines 1250. For example, the further away cursor 1230 is from the center 1260 of the gridlines in a particular direction, the faster a displayed page may move in that direction (e.g., by a user shifting their head if using a HMD to navigate the page). Conversely, the closer cursor 1230 is to the center 1260 of the gridlines in a particular direction, the slower a displayed page may move in that direction (e.g., by a user shifting their head using a HMD to navigate the page).

As used herein, the term "augmented reality" or "AR" generally refers to presenting digital information to a user that is directly registered to the user's physical, real-world environment such that the user may interact with it in real time. The digital information may take the form of images, sound, video, text, haptic feedback, olfactory feedback, or other forms. For example, the digital information may appear as a three-dimensional object that is overlaid over the user's physical environment in real-time, or as an audio commentary. As described herein, the term "augmented reality" may be used interchangeably with the term "mixed reality."

As used herein, the term "virtual reality" or "VR" generally refers to placing a user within (e.g., displaying) a completely computer-generated environment.

Figure 13:
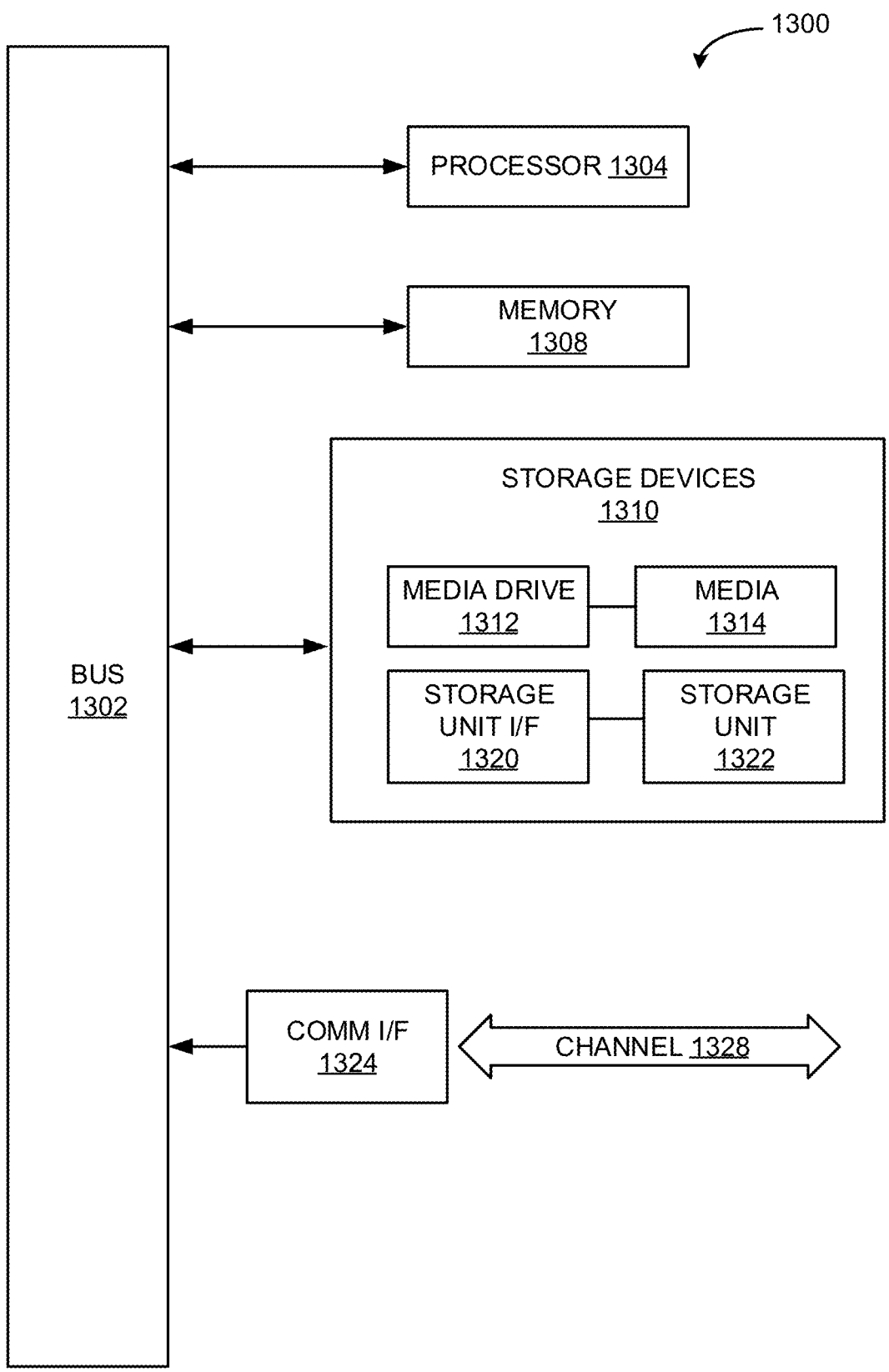
FIG. 13 illustrates an example computing module that may be used to implement various features of the methods disclosed herein.

FIG. 13 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 13. Various embodiments are described in terms of this example-computing module 1300. After reading this description, it will become apparent to a person skilled in the relevant art how to implement the application using other computing modules or architectures.

Referring now to FIG. 13, computing module 1300 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Intelligent integration module 135, in FIG. 1A, might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1300 might include, for example, one or more processors, controllers, control modules, or other processing devices, such as a processor 1304. Processor 1304 might be implemented using a general-purpose or special-purpose processing engine such as, for example, a microprocessor, controller, or other control logic. In the illustrated example, processor 1304 is connected to a bus 1302, although any communication medium can be used to facilitate interaction with other components of computing module 1300 or to communicate externally.

Computing module 1300 might also include one or more memory modules, simply referred to herein as main memory 1308. For example, preferably random access memory (RAM) or other dynamic memory, might be used for storing information and instructions to be executed by processor 1304. Main memory 1308 might also be used for storing temporary variables or other intermediate information during execution of instructions to be executed by processor 1304. Computing module 1300 might likewise include a read only memory ("ROM") or other static storage device coupled to bus 1302 for storing static information and instructions for processor 1304.

The computing module 1300 might also include one or more various forms of information storage mechanism 1310, which might include, for example, a media drive 1312 and a storage unit interface 1320. The media drive 1312 might include a drive or other mechanism to support fixed or removable storage media 1314. For example, a hard disk drive, a solid-state drive, a magnetic tape drive, an optical disk drive, a CD or DVD drive (R or RW), or other removable or fixed media drive might be provided. Accordingly, storage media 1314 might include, for example, a hard disk, a solid-state drive, magnetic tape, cartridge, optical disk, a CD or DVD, or other fixed or removable medium that is read by, written to or accessed by media drive 1312. As these examples illustrate, the storage media 1314 can include a computer usable storage medium having stored therein computer software or data.

In alternative embodiments, information storage mechanism 1310 might include other similar instrumentalities for allowing computer programs or other instructions or data to be loaded into computing module 1300. Such instrumentalities might include, for example, a fixed or removable storage unit 1322 and an interface 1320. Examples of such storage units 1322 and interfaces 1320 can include a program cartridge and cartridge interface, a removable memory (for example, a flash memory or other removable memory module) and memory slot, a PCMCIA slot and card, and other fixed or removable storage units 1322 and interfaces 1320 that allow software and data to be transferred from the storage unit 1322 to computing module 1300.

Computing module 1300 might also include a communications interface 1324. Communications interface 1324 might be used to allow software and data to be transferred between computing module 1300 and external devices. Examples of communications interface 1324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1324 might typically be carried on signals, which can be electronic, electromagnetic (which includes optical) or other signals capable of being exchanged by a given communications interface 1324. These signals might be provided to communications interface 1324 via a channel 1328. This channel 1328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1308, storage unit 1320, media 1314, and transitory channels 1328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
   running a first application for interacting with media content presented on a mobile display device, the mobile display device comprising a head mounted display (HMD) or a handheld mobile display device with a touchscreen;

monitoring, via a first operating system (OS) service of a mobile OS of the mobile display device, one or more user interactions with the mobile display device;

receiving input associated with a first user interaction of the one or more user interactions, wherein the input indicates an interactive command associated with a user interface (UI) control for interacting with the media content, wherein the first user interaction is: a voice interaction with an audio device coupled to the HMD or handheld mobile display device; a touch-based interaction with the touchscreen of the handheld mobile display device; or a motion interaction with the HMD or the handheld mobile display device;

after receiving the input, generating, using the first OS service, an event associated with the UI control;

transmitting the event from the first OS service to a second application;

determining that the first user interaction is not interpretable into an interactive command defined by the mobile OS of the mobile display device;

in response to determining that the first user interaction is not interpretable into the interactive command defined by the mobile OS, initiating, via the second application, execution of an emulation of the interactive command by generating an emulation control event based on the event received from the first OS service, wherein the emulation control event comprises an action description and coordinates of a cursor;

transmitting the emulation control event from the second application to a second OS service of the mobile OS, wherein the second OS service is configured to render content for presentation on the mobile display device; and rendering, via the second OS service of the mobile OS, the media content for presentation within a user interface associated with the first application based on the execution of a software procedure associated with the emulation control event, wherein rendering the media content comprises drawing and manipulating the cursor within the user interface of the first application.

2. The method of claim 1, wherein the first user interaction is the voice interaction, wherein the voice interaction is associated with receiving voice input, the method further comprising: triggering speech recognition for interpreting the voice input into a click event or a touch event, wherein the event is generated by the first OS service after the voice input is interpreted into the click event or the touch event.

3. The method of claim 2, wherein the voice input is received through a microphone communicatively coupled to a head mounted display.

4. The method of claim 1, wherein the first user interaction is the motion interaction, wherein the motion interaction is associated with receiving motion input, the method further comprising: using the motion input to track, via the second application, a change in position of a user wearing the HMD or holding the handheld mobile display device; and translating, using the second application, the tracked change in position into a cursor position change, wherein the cursor position change is used by the second application to generate the emulation control event.

5. The method of claim 4, wherein the motion input is head movement of the user wearing the HMD.

6. The method of claim 1, further comprising:
tracking a series of multiple user interactions with the media content;
tracking each of a plurality of actions generated to execute a sequence of interactive commands corresponding to the series of multiple user interactions;
storing each of the actions to define a re-executable sequence of interactive commands; and
upon triggering an optimized replay of interactions with the media content, automatically retrieving and executing each of the actions of the defined re-executable sequence of interactive commands in response to receiving a sub-series of the multiple user interactions, wherein the sub-series precludes repeating each of the user interactions in the series of multiple user interactions.

7. The method of claim 1, wherein the first application is a web application instance, the media content is a webpage, and the UI control is a control associated with the webpage.

8. The method of claim 1, wherein the first user interaction is the touch-based interaction with the touchscreen of the handheld mobile display device.

9. The method of claim 1, wherein the second application is configured to use one or more software procedures that define controls and associated actions for each of a plurality of we b-based applications that present web-based media content.

10. The method of claim 1, wherein the emulation control event comprises information corresponding to information contained in an event defined by the mobile OS; and wherein rendering the media content comprises modifying a viewport's presentation of the media content.

11. The method of claim 10, wherein the action description comprises: a click action, a zoom action, an action to draw the cursor, or some combination thereof.

12. The method of claim 1, further comprising: simultaneously rendering multiple viewports on the mobile display device, wherein the media content is rendered on one of the multiple viewports.

13. A non-transitory computer-readable storage medium having executable instructions stored thereon that, when executed by a processor, perform operations of:
running a first application for interacting with media content presented on a mobile display device, the mobile display device comprising a head mounted display (HMD) or a handheld mobile display device with a touchscreen;
monitoring, via a first operating system (OS) service of a mobile OS of the mobile display device, one or more user interactions with the mobile display device;
receiving input associated with a first user interaction of the one or more user interactions, wherein the input indicates an interactive command associated with a user interface (UI) control for interacting with the media content, wherein the first user interaction is: a voice interaction with an audio device coupled to the HMD or handheld mobile display device; a touch-based interaction with the touchscreen of the handheld mobile display device; or a motion interaction with the HMD or the handheld mobile display device;
after receiving the input, generating, using the first OS service, an event associated with the UI control;
transmitting the event from the first OS service to a second application;
determining that the first user interaction is not interpretable into an interactive command defined by the mobile OS of the mobile display device;

in response to determining that the first user interaction is not interpretable into the interactive command defined by the mobile OS, initiating, via the second application, execution of an emulation of the interactive command by generating an emulation control event based on the event received from the first OS service, wherein the emulation control event comprises an action description and coordinates of a cursor;

transmitting the emulation control event from the second application to a second OS service of the mobile OS, wherein the second OS service is configured to render content for presentation on the mobile display device; and rendering, via the second OS service of the mobile OS, the media content for presentation within a user interface associated with the first application based on the execution of a software procedure associated with the emulation control event, wherein rendering the media content comprises drawing and manipulating the cursor within the user interface of the first application.

14. The non-transitory computer-readable storage medium of claim 13, wherein the first user interaction is the voice interaction, wherein the voice interaction is associated with receiving voice input, the method further comprising: triggering speech recognition for interpreting the voice input into a click event or touch event, wherein the event is generated by the first OS service after the voice input is interpreted into the click event or the touch event.

15. The non-transitory computer-readable storage medium of claim 14, wherein the first user interaction is the motion interaction, wherein the motion interaction is associated with receiving motion input, the method further comprising: using the motion input to track, via the second application, a change in position of a user wearing the HMD or holding the handheld mobile display device; and translating, using the second application, the tracked change in position into a cursor position change, wherein the cursor position change is used by the second application to generate the emulation control event.

16. The non-transitory computer-readable storage medium of claim 15, wherein the motion input is head movement of the user wearing the HMD.

\* \* \* \* \*